United States Patent
Mitic et al.

(10) Patent No.: US 11,899,762 B2
(45) Date of Patent: Feb. 13, 2024

(54) ASSOCIATION VIA AUDIO

(71) Applicant: Spotify AB, Stockholm (SE)

(72) Inventors: Richard Mitic, Stockholm (SE); Göran Edling, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/829,665

(22) Filed: Jun. 1, 2022

(65) Prior Publication Data

US 2022/0366024 A1 Nov. 17, 2022

Related U.S. Application Data

(63) Continuation of application No. 16/385,140, filed on Apr. 16, 2019, now Pat. No. 11,379,566, which is a continuation of application No. 15/955,145, filed on Apr. 17, 2018, now Pat. No. 10,853,458.

(30) Foreign Application Priority Data

Apr. 16, 2018 (EP) ..................................... 18167553

(51) Int. Cl.
*G06F 21/31* (2013.01)
(52) U.S. Cl.
CPC .................................. *G06F 21/31* (2013.01)
(58) Field of Classification Search
CPC . G06F 21/31; H04L 63/083; H04N 21/25816; H04N 21/25875; H04N 21/43615; H04N 21/4627
See application file for complete search history.

(56) References Cited

U.S. PATENT DOCUMENTS

| 9,705,950 | B2 | 7/2017 | Trammell |
| 10,019,133 | B1 | 7/2018 | McNeill |
| 10,133,816 | B1* | 11/2018 | Bilinski ................ G06F 16/686 |
| 10,853,458 | B2 | 12/2020 | Mitic |
| 2008/0081558 | A1 | 4/2008 | Dunko |

(Continued)

FOREIGN PATENT DOCUMENTS

| CA | 2827387 | 8/2012 |
| EP | 3306892 | 4/2018 |

OTHER PUBLICATIONS

Chirp, "How Chirp Works". Accessed Mar. 14, 2018. Available at: https://www.chirp.io/technology/.

(Continued)

*Primary Examiner* — Philip J Chea
*Assistant Examiner* — Sangseok Park
(74) *Attorney, Agent, or Firm* — Merchant & Gould P.C.

(57) ABSTRACT

A source device being associated with an account uses playback of a media content item to cause a target device to become associated with the account. The target device enters an association mode and records a portion of the playing content. The target device provides the recording to a server that identifies the song (e.g., using a music fingerprint service) and uses the identification of the song to find the account that caused playback of the identified song. With the account identified, the server provides credentials of the account to target system. The target device accesses content or services using the account. As confirmation of receiving the credentials, the server causes playback of the content to transition to from the source device to the target device.

20 Claims, 7 Drawing Sheets

(56) References Cited

U.S. PATENT DOCUMENTS

| | | | |
|---|---|---|---|
| 2013/0051755 A1* | 2/2013 | Brown | H04N 21/25875 386/E9.011 |
| 2013/0110772 A1* | 5/2013 | Svendsen | G06F 16/435 707/E17.005 |
| 2013/0244772 A1 | 9/2013 | Weber | |
| 2014/0304796 A1 | 10/2014 | Hassan et al. | |
| 2015/0105046 A1 | 4/2015 | Grosby | |
| 2016/0105428 A1 | 4/2016 | Schrempp et al. | |
| 2016/0212552 A1 | 7/2016 | Schneider | |
| 2016/0234273 A1 | 8/2016 | Trammell | |
| 2016/0285868 A1* | 9/2016 | Branam | H04L 63/0869 |
| 2017/0019394 A1* | 1/2017 | Yastrebenetsky | H04L 63/083 |
| 2017/0251040 A1 | 8/2017 | Archambault | |
| 2018/0060320 A1 | 3/2018 | Oganian | |
| 2018/0098120 A1 | 4/2018 | Cho | |
| 2018/0338177 A1 | 11/2018 | Graham | |
| 2018/0358009 A1* | 12/2018 | Daley | G06F 3/167 |
| 2019/0318070 A1 | 10/2019 | Mitic | |

OTHER PUBLICATIONS

European Communication in Application 20155223.9, dated Dec. 17, 2020, 13 pages.

European Communication in Application 20155223.9, dated Jul. 15, 2020, 11 pages.

European Extended Search Report in Application 20155223.9, dated Mar. 25, 2020, 10 pages.

European Extended Search Report in Application 20171797.2, dated Jul. 28, 2020, 5 pages.

European Extended Search Report in Application 22154362.8, dated Apr. 25, 2022, 10 pages.

Extended European Search Report from European Appl'n No. 18167553.9, dated Sep. 6, 2018.

Anonymous, "Smart Speaker—Wikipedia", Apr. 12, 2018, retrieved from the internet at: https://en.wikipedia.org/w/index.php?title=Smart_speaker&oldid=836132678, retrieved on Apr. 21, 2022, 4 pages.

* cited by examiner

ASSOCIATION VIA AUDIO

CROSS-REFERENCE TO RELATED APPLICATION(S)

This application is a continuation of U.S. application Ser. No. 16/385,140, filed Apr. 16, 2019, which is a continuation of U.S. application Ser. No. 15/955,145, filed Apr. 17, 2018, now U.S. Pat. No. 10,853,458, which claims benefit of European Patent Application No. 18167553.9, filed Apr. 16, 2018, which applications are incorporated herein by reference in their entirety. To the extent appropriate, a claim of priority is made to each of the above disclosed applications.

TECHNICAL FIELD

The present disclosure relates to technical solutions for associating a target device with credentials of a source device.

BACKGROUND

The process of associating a software or hardware product with an account of a user often includes the user providing a username and password using a tactile or virtual keyboard. However, there are technical drawbacks and challenges with this process; among others: not all devices have a keyboard (e.g., voice-first devices), not all keyboards are available for use (e.g., for attention or accessibility reasons), and username-password combinations are not always ideal for authentication. Login difficulties are compounded by frequent switching of accounts, such as among family members sharing a device or when providing guest access.

While advancements have been made in transferring login credentials from one device to another, technical challenges still remain. Some techniques include pairing an already logged-in device with a non-logged-in device, and transferring the credentials from the logged-in device to the non-logged-in device via an auxiliary channel, such as using HTTP on a local network (e.g., using zero-configuration networking). Other techniques include device pairing over BLUETOOTH and transferring a login token over the connection. Typically, these techniques require an extra communication channel and, depending on the communication technique, consume significant energy resources for both devices. Such techniques further raise concerns when used for guest mode access. For example, where a connection is made via a WI-FI network, sharing access credentials for the same network can be undesirable for security or privacy purposes.

Still other techniques use audio to transmit data, such as using broadband phase difference encoding. Such techniques can synthesize audio directly or by masking with existing audio. For example, Multimedia Information Hiding Technologies for Controlling Data (Kazuhiro Kondo, 2013) describes the use of acoustic orthogonal frequency-division multiplexing at page 94. Some techniques include transferring small amounts of data encoded in an audio signal, decoding the data, and then using the decoded data to look up large pieces of data available at a backend system. Fast Fourier transform or similar transforms are usable to extract the sequence of tones on the client side and transmit that to the backend to retrieve the larger information. Using audio to transmit data often results in robotic-sounding audio lacking aural aesthetics.

US 2017/0019394 describes playing media items from a guest's media account on a host's media player. A guest device discovers a host media player over a wireless local area network. A token is provided from the host media player to the guest device. The token is encoded into an audio file, which is played by the host media player. The audio is captured by the guest device and decoded into the token, which is transmitted to a server for verification.

SUMMARY

The present disclosure provides methods, apparatuses, and computer-readable products for using audio to associate a target device with credentials of a source device.

In an embodiment, there is a method that includes receiving an association request from a target device, the association request having a recording of at least a portion of a media content item. The method further includes identifying an identifier of the media content item based on the recording. The method further includes selecting an account from an account data store based on the identifier of the media content item. The method further includes associating the target device with the account.

In some examples, the method further includes prior to receiving the association request: receiving, from a source device, a media content item playback request for the media content item, wherein the second device is associated with the account; and causing playback of a media content item at the source device, thereby fulfilling the media content item playback request. In some examples, the method further includes, responsive to associating the target device with the account, transferring the playback of the media content item from the source device to the target device. In some examples, associating the target device with the account includes providing credentials to the target device. In some examples, the method further includes obtaining one or more signals from the target device. Selecting the account from the account data store is further based on the one or more signals. In some examples, the media content item includes music. In some examples, the method further includes estimating a playback start time of the media content item. Selecting the account from the account data store is further based on the playback start time. In some examples, identifying the identifier is not based on audio steganography.

In an embodiment, there is a system that includes a source device, a target device, and a media delivery system. The source device has one or more source device processors coupled to a source device memory storing source device instructions which when executed cause the one or more source device processors to play a media content item. The target device has one or more target device processors coupled to a target device memory storing target device instructions which when executed cause the one or more target device processors to: record an ambient noise recording including at least a portion of the media content item; and provide the ambient noise recording for identification. The media-delivery system having one or more media-delivery system processors coupled to a media-delivery system memory storing media-delivery system instructions which when executed cause the one or more media-delivery system processors to: receive the ambient noise recording from the target device; identify an identifier of the media content item based on the ambient noise recording; determine, based at least in part on the identifier, an account that played the media content item; and provide credentials associated with the account to the target device.

In some examples, the media-delivery system instructions when executed further cause the one or more media-delivery system processors to transfer playback of the media content item from the source device to the target device. In some examples, transferring playback of the media content item from the source device to the target device includes sending a message to cause playback to fade out at the source device and sending a message to cause playback to fade-in at the target device. In an example, the source device instructions, when executed, further cause the one or more source device processors to: request playback of the media content item from the media delivery system; and receive the media content item from the media delivery system. In an example, the source device instructions, when executed, further cause the one or more source device processors to: responsive to playing the media content item, provide a media playback receipt to the media delivery system. Playing the media content item includes playing the media content item locally from the source device. In an example, identifying the identifier of the media content item includes audio fingerprinting. In an example, identifying the identifier is not based on audio steganography.

In an example, there is a method including: operating a media playback appliance in a primary mode associated with a first account; responsive to receiving a guest mode signal, creating an audio recording using a sound sensing device of the media playback appliance, wherein the audio recording contains audio associated with a media content item played by a device associated with a second account; providing the audio recording from the media playback appliance to a remote server for identification of the media content item; and operating the media playback appliance in a guest mode associated with the second account based on the identification of the media content item.

In an example, the method further includes receiving the guest mode signal over a voice-based user interface of the media playback appliance. In an example, operating the media playback appliance in the guest mode includes operating with a limited set of permissions compared to the primary mode. In an example, operating the media playback appliance in the guest mode includes operating in the guest mode until a certain number of media content items are played. In an example, operating the media playback appliance in the guest mode includes storing credentials of the first account in association with the primary mode. In an example, the method further includes responsive to the media playback appliance receiving a reversion signal while operating in the guest mode associated with the second account, operating the media playback appliance in the primary mode associated with the first account. In an example, the method further includes obtaining credentials associated with the first account from the remote server. In an example, the method further includes, after beginning to operate in the guest mode, receiving from a media server application at least a portion of the media content item; and playing the media content item using the media playback appliance. In an example, playing the media content item includes starting playback of the media content item at a location other than a beginning of the media content item. In an example, playing the media content item includes fading in playback responsive to receiving a fade-in message. In an example, receiving credentials associated with the second account at the media playback appliance. In an example, operating in the guest mode associated with the second account based on the identification of the media content item includes operating in the guest mode using the credentials. In an example, providing the audio recording includes performing an application programming interface call with the recording and a location of the media playback appliance as parameters of the application programming interface call. In an example, the media playback appliance automatically reverts to the primary mode associated with the first account after an event occurs. In an example, the media playback appliance automatically reverts to the primary mode associated with the first account after a device power event occurs.

In an example, there is a system that includes one or more processing devices; and a computer-readable memory device coupled to the one or more processing devices and comprising instructions thereon that, when executed by the one or more processing devices, cause the one or more processing devices to perform any of the previously described methods.

BRIEF DESCRIPTION OF THE DRAWINGS

The features and advantages of the present disclosure will become more apparent from the detailed description set forth below when taken in conjunction with the following drawings.

DETAILED DESCRIPTION

Figure 1:
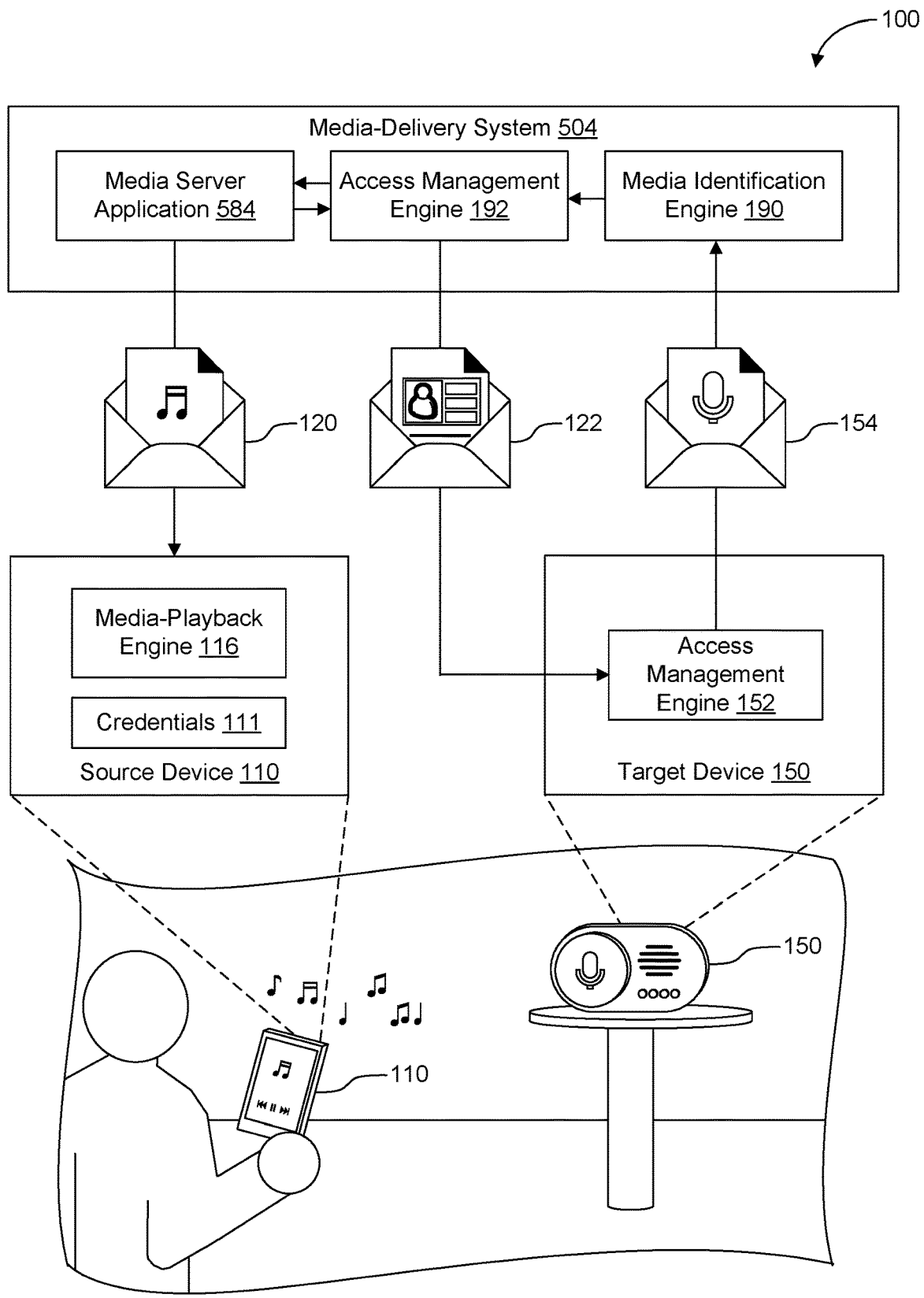
FIG. 1 illustrates an example system including a source device, a target device, and a media delivery system.

The example embodiments presented herein are directed to systems, methods, and non-transitory computer-readable medium products for associating a target device with credentials of a source device based on playback of a media content item, such as a song. This is for convenience only, and is not intended to limit the application of the present invention. After reading the following description, it will be apparent to one skilled in the relevant art how to implement the following disclosure in alternative embodiments.

As used herein, "credentials" are data usable for authentication or to gain access to particular content or services. In some of the example embodiments described below, credentials are associated with a first account (e.g., credentials usable to log into or otherwise gain access to services associated with a particular account). Credentials are used to perform an authentication or association process with an application or server, such as using OAUTH 2.0, OPENID CONNECT (maintained by the OPENID FOUNDATION), SAML (maintained by OASIS of Burlington, MA), or other standards, protocols, or techniques. Other uses for, and examples of, credentials will be apparent to one of skill in the art.

In some examples, the credentials are representative of a username and password for a first account of a service. In some instances, the credentials are use-limited or time-limited, such as one-session-use credentials or credentials that are valid for limited amount of time.

As used herein, "target device" refers to a computing device with which credentials are to be associated and "source device" refers to a computing device with which the credentials are currently associated.

In an example use case, a smartphone has stored thereon an audio streaming service application that communicates with an audio streaming service that is remote from the smartphone. The application is being executed by the mobile device and operating under a first account (e.g., an account of a first user). The first user also wants to access the audio streaming service using the first account on a nearby smart speaker system. The smart speaker system is an Internet-connected speaker system that is controllable by a voice-based user interface. The smart speaker system is also able to play media content items from an audio streaming service. For the speaker system to gain access to the audio streaming service, and particularly under the first account, the user causes the smart speaker to enter an association mode by saying "Ahoy speaker, give me access". The user further causes the smart phone to, either simultaneously or substantially simultaneously, play music on the smartphone using the audio streaming service application. The smart speaker system records a portion (also sometimes referred to as a "snippet") of the music that is being played and communicates the recording to a server. The server identifies the music (e.g., using an audio fingerprint service of a media identification engine), and uses the identification of the music to locate the first account associated with the identified music. With the first account identified, the server provides credentials associated with the first account to the smart speaker system, which enables the smart speaker system to access the audio streaming service using the first account. To provide the user confirmation, the server causes playback of the music to transition from the smartphone to the smart speaker system. Because the server has logs that include the first account that caused playback, the server not only causes playback of the music in general, but also causes playback of music within the same context as the played music (e.g., the album or playlist from which the music was played on the smartphone) by looking up the context in which the first account was operating.

Continuing the example use case, a second user having a second account (e.g., a friend of the first user) visits and wants to control the smart speaker system from her tablet computer. The smart speaker system includes a guest-mode button. The second user instructs the smart speaker system to enter a guest mode by pressing a guest-mode button on the smart speaker system. The guest-mode button on the smart speaker system, when selected, causes the smart speaker system to store the credentials that the smart speaker system is currently associated with (e.g., the credentials of the first user that the smart speaker system is using to access the audio streaming service using the first account). The selection of the guest-mode button further causes the smart speaker system to record ambient noise via a microphone. The second user causes her tablet computer to play music using her account. The smart speaker system records a portion of the music and communicates the recording to a server. Again, the server identifies the music within the recording, and uses the identifier (e.g., a song title or uniform resource identifier) corresponding to the music to find the account under which the streaming service played the identified music. This time, the server identifies the second (e.g., friend's) account as causing playback and associates the second account with the smart speaker system. For instance, the server sends the credentials of the second account to the smart speaker system or associates an identifier of the smart speaker system with the second account such that the smart speaker system is authorized to access services associated with the second account. The smart speaker system receives the credentials and flags them as being guest credentials. The second speaker system can then play music associated with the second account. After the second user leaves and the music playback stops, the smart speaker system enters a sleep mode, removes the credentials of the second account, and reassociates itself with the first user's credentials.

Among other advantages, embodiments disclosed herein allow for the association of an account with a nearby device by playing songs, music, podcasts, audiobooks, and other media content items. In contrast to using audio steganography to transmit login tokens, the use of media content items in the process provides several advantages. For example, the content need not necessarily be specially formatted (e.g., formatted to encode messages or data) for the purpose of logging in the account. This increases security by obviating the need to receive login credentials audibly broadcast by a device or user. It also increases user flexibility by allowing the user to choose from a variety of media content items to play for the purposes of logging in. Disclosed embodiments further allow the use of aesthetic audio (e.g., songs or music) in the process of associating the device rather than using unnatural sounding audio that normally results from audio steganography. Further still, disclosed embodiments conserve computing resources by allowing the user to quickly play media content items at the target device by combining association of the target device with the account and also by providing media content for the target device to play. Other advantages will be apparent to one skilled in the art on consideration of the embodiments described herein.

System for Using Audio to Associate a Target Device with Credentials of a Source Device FIG. 1 illustrates an example system 100 including a source device 110, a target device 150, and a media-delivery system 504. In the illustrated example, audio is played from the source device 110 to associate credentials 111 with the target device 150. The source device 110 is a media-playback device that stores the credentials 111 in memory of the source device 110. The credentials 111 are data usable by a device to access specific services or content, particularly with reference to an account.

In an example, the media-delivery system 504 is a streaming audio service. The source device 110 stores the credentials 111, which are associated with an account that the user has with the streaming audio service. In such an example, an application running on the source device 110 uses the credentials 111 to access streaming audio services associated with the account. The services can include, for example, audio playback services, library management services (e.g., a song library, a playlist library, or an album library, among others), media content purchasing services, taste profile services (e.g. services relating to the likes and dislikes of the user), content sharing services, and account management services, among others.

The source device 110 includes a media-playback engine 116. The media-playback engine 116 operates to cause playback of media content items. In many examples herein, the media content items are audio content items, such as music. In some examples, the media content items take other forms (e.g., visual content items, such as videos). The media-playback engine 116 receives a media content item 120 from the media-delivery system 504 for local playback at the source device 110. In addition or in alternative, the media content item 120 can be provided from another source (e.g., by being transferred from another computer). The media content item 120 includes sufficient data to be played by the source device 110. In many examples, the media content item 120 is streamed in playable parts from the media-delivery system 504 to the source device 110. In other instances, the media content item 120 is provided as a whole item provided by the media-delivery system 504 that is not playable until the entirety is downloaded.

In some examples, the media-playback engine 116 receives a selection of a media content item 120 for playback from the user over a user interface of the source device 110. In other examples, the media-delivery system 504 or the media-playback engine 116 selects the media content item 120 for playback without receiving a selection of a particular media content item from a user.

The target device 150 is a computing device to which the credentials 111 are to be provided. In many examples, the target device 150 already stores or is otherwise associated with credentials. For instance, the target device 150 stores credentials associated with an account of owner of the target device 150. Nonetheless, the target device 150 provides a guest mode via which the credentials 111 are associated with the target device 150. In the illustrated example of FIG. 1 and as further described herein, the target device 150 obtains the credentials 111 associated with the source device 110.

The source device 110 plays the media content item 120 using the media-playback engine 116. Before or during playback of the media content item 120, the target device 150 enters an association mode. In an example, upon entering the association mode, the access management engine 152 of the target device 150 activates one or more sound input devices associated with the target device 150 to record ambient noise near the target device 150 to create an ambient noise recording 154. With the source device 110 sufficiently close to the target device 150, the ambient noise recording 154 will include the sound of the media content item 120 being played by the media-playback engine 116. The target device 150 (e.g., the access management engine 152 thereof) then sends the ambient noise recording 154 to the media-delivery system 504.

The media-delivery system 504 uses the media identification engine 190 to identify a media content item contained within the ambient noise recording 154. The identification of the media content and other signals (e.g., metadata associated with the ambient noise recording 154) are then provided to the access management engine 192 of the media-delivery system 504.

The access management engine 192 uses the output of the media identification engine 190 along with data regarding playback of media content items from the media server application 584 to identify the source of the media playback. The identity of the source of the media playback can include one or more of a device identifier of a device associated with playback (e.g., the identifier of the device that played the identified media content item), an identity of the credentials associated with playback, an identifier of an account associated with playback, or other indications of the source of the media content item in the ambient noise recording 154.

With source identified, the access management engine 192 provides credentials 122 associated with the identified source to the access management engine 152 of the target device 150. In some examples, the credentials 122 are identical to the credentials 111. In other examples, the credentials 122 are similar to the credentials 111 but have one or more different characteristics. Both credentials 111, 122 are associated with a same account, but the credentials 122 are flagged to distinguish the credentials 122 from the credentials 111, for instance. Flagging the credentials 122 provides benefits to revoking credentials 122 at a later time (e.g., manually or automatically responsive to detecting that a user associated with the credentials 122 left the vicinity of the target device 150) by allowing the credentials to be identified as, for example, guest credentials. Further, the user may not want the target device 150 (or other users thereof) to have full access to his or her account for purposes of privacy, security, or account management purposes. As a result, the credentials 122 being flagged can indicate that the credentials 122 are associated with a more limited set of permissions than the credentials 111. The degree of similarity in permissions of the credentials 111 and the credentials 122 is modifiable, in an example.

The target device 150 uses the credentials 122 to access services or content provided by the media-delivery system 504. In an example, playback of the media content item 120 is transferred from the source device 110 to the target device 150 automatically in response to the target device 150 accessing the media-delivery system 504 using the credentials 122. The transfer of playback provides an improved user experience by serving as a confirmation that the association completed successfully.

The source device 110 and target device 150 are illustrated as being a smartphone and a media streaming appliance, respectively, but the devices 110, 150 can take a variety of forms, including, but not limited to, laptop computers, desktop computers, media streaming appliances, smart speakers, Internet-of-things devices, and vehicle head units, among others.

Figure 2:
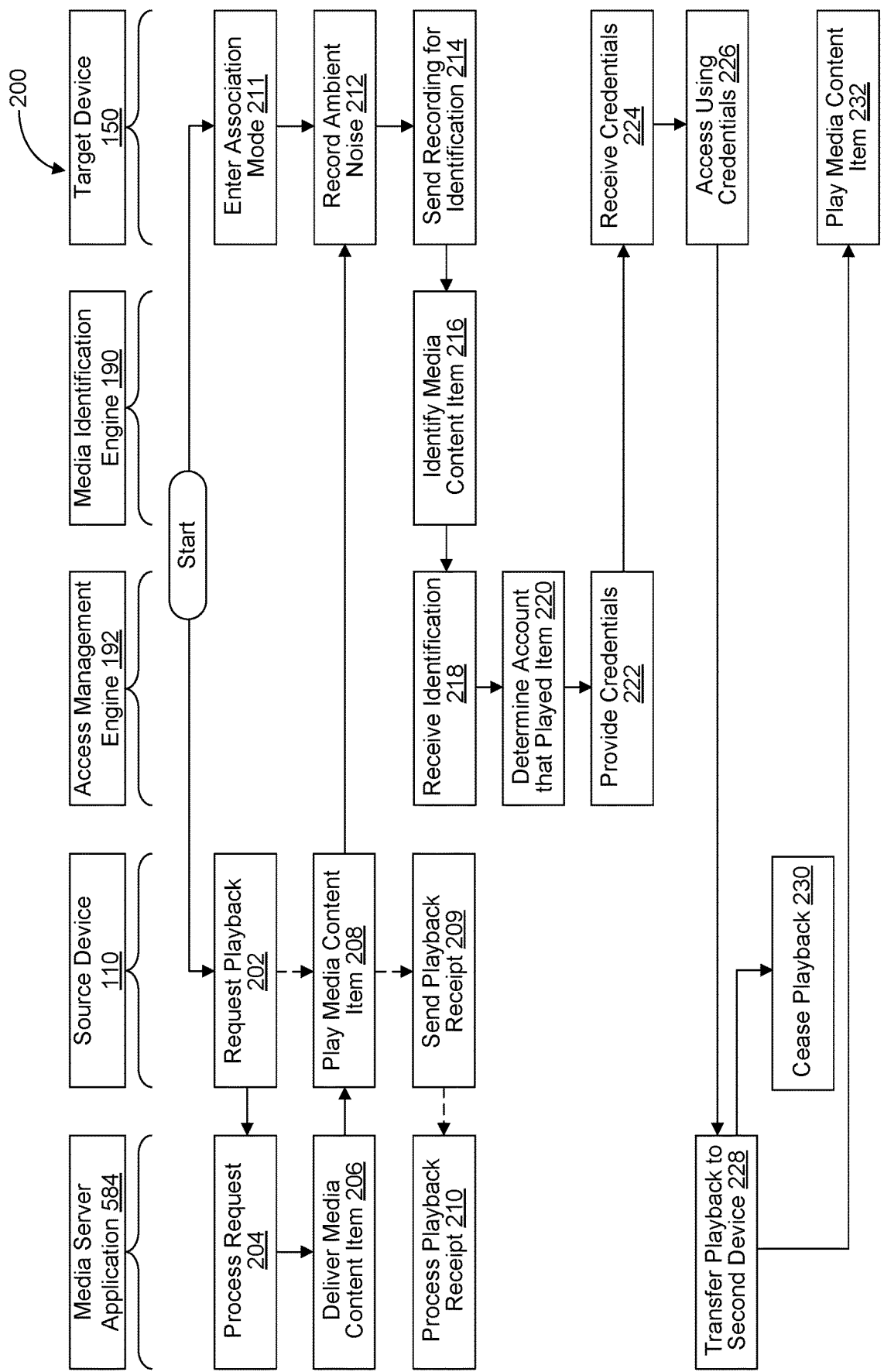
FIG. 2 illustrates a process for using audio to associate the target device with credentials of a source device.

Additional features of the system 100 and processes for providing access based on audio are described herein, such as in relation to FIG. 2, which describes a process for using audio to associate the target device 150 with the credentials 111 of the source device 110.

Process for Using Audio to Associate a Target Device with Credentials of a Source Device FIG. 2 illustrates a process 200 for using audio to associate the target device 150 with the credentials 111 of a source device 110.

In an example the process 200 is performed by a system including the source device 110, the target device 150, the media identification engine 190, the access management engine 192, and the media server application 584. As illustrated, the process 200 includes various operations performed by the source device 110, the access management engine 192, the media identification engine 190, the target device 150, and the media server application 584. In an example, the source device 110 has one or more source device processing devices coupled to a source device memory device storing source device instructions which when executed cause the one or more source device processing devices to perform one or more of the operations described herein. In an example, the target device 150 has one or more target device processing devices coupled to a target device memory device storing target device instructions which when executed cause the one or more target device processing devices to preform one or more of the operations described herein. In an example, the media-delivery system 504 has one or more media-delivery system processing devices coupled to a media-delivery system memory device storing media-delivery system instructions which when executed cause the one or more media-delivery system processing devices to perform one or more of the operations described herein, including one or more operations described herein regarding the access management engine 192 and the media identification engine 190. The processing devices and the memory devices are described in further detail in relation to FIGS. 5A and 5B.

As illustrated, the process 200 begins with operation 202 or 211.

At operation 202, the source device 110 requests playback of a media content item. In many examples, requesting playback includes the source device 110 sending a request for a media content item from the media server application 584.

In an example, this operation 202 is performed automatically in response to the source device 110 detecting over a user interface (e.g., a touch screen user interface or an utterance-based user interface) that a media content item is selected for playback by a user. In some instances, selection of a particular media content item is received. In other instances, selection of a kind of media content item is received (e.g., a shuffle album user interface element is selected). The source device 110 sends a request including an identification of the selected media content item to the media server application 584. In an example, the request is based on or includes the credentials 111.

In other examples, the operation 202 is performed automatically in response to the source device 110 detecting over a user interface that an audio-association user interface element is activated. An audio-association user interface element is an element activatable by a user, using audio to associate a target device with credentials of the source device 110. Where the operation 202 is performed in response to activation of an audio-association user interface element, the source device 110 sends a message requesting a media content item to the media server application 584, and the message is flagged with an indication that the playback request is part of a request to associate the source device 110 with a target device. In such instances, the source device 110 provides additional information with the request usable for identifying the account during the association process. For instance, the request can include additional metadata regarding the device, including its location, altitude, and nearby WI-FI SSIDs (Set Service Identifiers), among other data.

In other examples, requesting playback in operation 202 includes the source device 110 requesting playback of media content stored locally at the source device 110. For instance, receiving a request over a user interface to play a media content item located on the source device 110 (e.g., in a cache or having previously been downloaded responsive to a request to offline the media content item from a user). In such instances, source device 110 plays the media content item without needing to obtain the media content item from the media server application 584. As a result, after requesting playback in operation 202, the flow would move to operation 208 rather than operation 204.

At operation 204, the media server application 584 processes the playback request from the source device 110. Processing the playback request includes a variety of steps, including, but not limited to, extracting relevant information from the request. The media server application 584 extracts an identification of the requested media content item from the request. In some examples, the media server application 584 extracts further information from the request, such as the location of the target device, and information regarding the requesting account, among other data.

In many instances, processing the request includes selecting a media content item associated with the request (e.g., a media content item associated with a media content identifier contained in the request) from a store of media content items available at the media server application 584.

Processing the request further includes storing information associated with the request at the media server application 584, such as information obtained directly from, or inferred from, the request sent in operation 202. In many instances, the information is related to logging which account requested which media content item for playback at which time. In other instances, the media server application 584 stores additional information associated with the request, such as may be provided when the request is expressly flagged as being part of an association request.

When the request is flagged as being part of an association request, and a specific media content item does not accompany the request, additional processing is able to be performed to choose an appropriate media content item with which to fulfill the request, such as selecting a media content item that matches a taste profile associated with the source device 110 that nonetheless is not being played by a significant number of other devices or accounts at the time. In further instances, processing an expressly flagged request can cause the media server application 584 to modify a media content item prior to sending it to the source device 110 for playback, such as by adding a watermark (e.g., a particular frequency outside of a human hearing range), modifying one or more properties of the media content item to make it more easily recognizable (e.g., boosting certain frequencies), encoding a token associated with the account of the source device 110, encoding data in an audio signal and mixing the signal into the media content item, among others. In some instances, the modifications are performed by the source device 110 rather than the media server application 584. In an example, processing a flagged request includes updating an entry in a data store reflecting that an account is or credentials are participating in an association process.

At operation 206, the media server application delivers the media content item to the source device 110. This operation 206 can include streaming portions of the media content item 120 to the source device 110. Portions of the media content item 120 are streamed to the source device 110 and stored in a buffer for playback, for instance. In other examples, this operation 206 includes downloading substantially the entire media content item 120 to the source device prior to playback.

At operation 208, the source device 110 plays the media content item 120. For example, the source device receives the media content item 120, and the source device 110 plays the media content item 120 from a buffer of the source device 110. In another examples, the source device 110 plays the media content item 120 from a cache or other location local to the source device 110.

At operation 209, the source device 110 sends a playback receipt to the media-delivery system (e.g., the media server application 584 thereof). In an example, the source device 110 sends the playback receipt where playing media content item 120 includes playing the media content item 120 locally from the source device 110. In some examples, the source device 110 stores data associated with playback in a playback receipt. A playback receipt can include data regarding the playback, such as the time that the playback was initiated, the length of time the media content item was played, the identifier of the media content item that was played, and the account associated with the playback, among other data. The source device 110 periodically sends playback receipts to the media-delivery system 504.

At operation 210, the media-delivery system 504 processes the playback receipt. The media-delivery system 504 receives the receipts and updates a data store with the associated data. The media-delivery system 504 uses the receipts and associated data for a variety of purposes, including diagnostics, updating a user's taste profile, and royalty calculations, among others. The receipts and the data contained therein are further relevant to identifying an account that caused playback of a media content item as described herein.

At operation 211, the target device 150 enters an association mode. Before or after the source device 110 requests playback in operation 202, the target device 150 enters an association mode. The target device 150 can enter the association mode in response to a variety of causes. In some examples, the target device 150 automatically enters the association mode responsive to determining that the target device 150 is attempting to operate without credentials. For instance, the target device 150 was activated for a first time and was not preconfigured with an account. In other examples, the target device 150 finished a log-out mode in which the target device 150 disassociated itself from particular credentials. In other examples, the target device 150 receives a signal from another device (an electronic signal or an acoustic signal, among others) that causes the target device 150 to enter the association mode. In still other examples, the target device 150 enters the association mode, responsive to the target device 150 receiving a user input. In an example, the target device 150 receives the utterance "enter association mode" as user input via an utterance-based user interface, and enters the association mode in response thereto. In another example, the target device 150 detects that a tactile or virtual button has been selected on a user interface, and enters the association mode in response thereto.

In entering the association mode, the target device 150 prepares to become associated with regular credentials. In the illustrated example, responsive to entering the association mode, the target device 150 prepares to record ambient noise. The target device 150 activates one or more sound input devices, for instance. Where the target device 150 is already associated with credentials, entering the association mode further includes disassociating the target device 150 from existing credentials. In still further examples, entering the association mode takes different forms depending on the kind of association mode selected. The target device 150 is able to operate in a variety of modes, each mode having its own characteristics and permissions. The target device 150 is able to be operated in a guest mode and a primary mode, for instance. Operating in a guest mode includes the target device 150 temporarily being associated with particular credentials. For instance, rather than target device 150 removing existing credentials, those credentials are stored locally to the target device 150 for later use, such as after the guest mode ends. In still other examples, entering the guest mode includes the target device 150 setting a limit on one or more features of the target device 150. For instance the target device 150 prevents one or more features of the target device 150 from being used by the guest account.

At operation 212, the target device 150 records ambient noise. The target device 150 activates one or more sound input devices to obtain the ambient noise recording 154. In some examples, this includes the creation of an audio clip of the ambient noise. In other examples, recording the ambient noise includes establishing a streaming connection with a remote device (e.g., the media identification engine 190). For instance, target device 150 records the ambient noises to a buffer at the target device 150, and the contents of the buffer are streamed to the target location.

At operation 214, the target device 150 sends an association request that includes the ambient noise recording 154 for identification. The implementation of sending the ambient noise recording 154 for identification varies, depending on how the ambient noise recording 154 is produced. As previously described, recording ambient noise can include streaming the ambient noise recording 154 to a remote location as it is occurring or storing the ambient noise recording 154 as an audio file for transmission once the recording ceases. The target device 150 sends the ambient noise recording 154 for identification by the media identification engine 190.

In the illustrated example, the target device 150 records the ambient nose 212 in operation 212 after the source device 110 plays the media content item in operation 208. In this manner, prior to receiving the association request, the media server application 584 receives, from the source device 110, the media content item playback request for the media content item 120, and causes playback of the media content item 120 at the source device 110, thereby fulfilling the media content item playback request. The media source device 110 is associated with the account 342.

In some instances, the target device 150 sends the ambient noise recording 154 by accessing an application programming interface (API) of the media identification engine 190. Accessing the API includes performing an API call and providing the ambient noise recording 154 as a parameter (e.g., the audio file, an address of the audio file, a location to which the audio file was streamed, or a location from which the audio file was streamed) to the API call. Other parameters are also able to be provided via the API call. For instance, a location of the target device 150 and an altitude of the target device 150, among others. In an example, the access management engine 192 or another portion of the media-delivery system 504 exposes an API where audio, time, and location, are submitted, and the access management engine 192 will return a URI (uniform resource identifier) of the media content item associated with the audio, as well as a context from which the media content item was played. In some instances, the target device 150 sends the ambient noise recording 154 directly to the media identification engine 190. In other examples, the target device 150 sends the ambient noise recording 154 to an end point of a remote media content server 580, and the media content server 580 then provides the media identification engine 190.

At operation 216, the media identification engine 190 receives the association request and identifies a media content item associated with the ambient noise recording 154. In an example, operation 216 includes the media-identification engine receiving the association request from the target device 150, the association request having the ambient noise recording 154 that includes at least a portion of the media content item 120. The media identification engine 190 then identifies an identifier of the media content item 120 based on the ambient noise recording 154. The media identification engine 190 is able to identify the media content item 120 via any of a variety of techniques. In an example, the media identification engine 190 performs audio fingerprinting on the ambient noise recording 154 to obtain an audio fingerprint of the ambient noise recording 154. In this manner, identifying the identifier of the media content item 120 includes audio fingerprinting. The media identification engine 190 then compares the audio fingerprint of the ambient noise recording 154 to audio fingerprints of known media content items. If the media identification engine 190 identifies a sufficiently close match, then the media identification engine 190 associates the ambient noise recording 154 with the matched media content item. For instance, the media identification engine 190 tags the ambient noise recording 154 with an identifier of the matched media content item. In an example, the identification is based solely on audio fingerprinting of the ambient noise recording 154 and is not based on a concealed message or token within the ambient noise recording 154 (e.g., not based on a message concealed in the ambient noise recording 154 using audio steganography).

An example of a usable audio fingerprinting technique is described in U.S. Pat. No. 8,492,633, which describes a method for fingerprinting an unknown music sample. Known music tracks are segmented into reference samples, and for each sample a reference fingerprint including a plurality of codes is generated. An inverted index including, for each possible code value, a list of reference samples having reference fingerprints that contain the respective code value is generated. An unknown fingerprint including a plurality of codes is generated from an unknown music sample. A code match histogram lists candidate reference samples and associated scores, each score indicating a number of codes from the unknown fingerprint that match codes in the reference fingerprint. Time difference histograms are generated for two or more reference samples having the highest scores. A determination is made whether or not a single reference sample matches the unknown music sample based on a comparison of the time difference histograms. As a result of the comparison, the unknown music sample can be identified. Other techniques are usable as well.

In some examples, multiple potential matches are identified. For instance, the same song may appear on multiple different albums, such as its original album, a greatest hits album, a movie soundtrack, a compilation album, and so on. Depending on the configuration of a media library or a fingerprinting database, these recordings may each have a different identifier associated with them. In such instances, if there are multiple sufficiently close media content items, then they can all be selected and used.

The media identification engine 190 sends the one or more identities of the media content item to the access management engine 192. The media identification engine 190 further sends additional information regarding the media content item to the access management engine 192.

At operation 218, the access management engine 192 receives the one or more identifiers of the media content item from the media identification engine 190. The access management engine 192 can also obtain additional information from another source. For instance, where the recording is sent from the target device 150 to the media-delivery system 504, the access management engine 192 obtains further data from another portion of the media-delivery system 504, such as further data regarding the identified media content item, recording, and the circumstances of the recording.

At operation 220, the access management engine 192 determines an account that caused playback of the media content item. The access management engine 192 determines the account in a variety of ways. In an example, the access management engine 192 determines whether a single account recently played a media content item having the one or more identifiers (e.g., by comparing the identifiers with entries in a media playback log or database of the media server application 584). If a single account is identified, then the access management engine 192 identifies that single account as the account that caused playback of the media content item in the recording.

The access management engine 192 can use further parameters for determining which account played the media content item. For example, as part of the identification of the media content item in operation 216, the media identification engine 190 can further estimate a start time of the media content item. For instance, the media identification engine 190 can use characteristics of the recording to determine which portion of a media content item was played and calculate backwards from that point to determine when the playback the media content item was likely to been initiated in order for the recording to include that portion of the media content item at that time. In such instances, the access management engine 192 can compare the estimated start time with the media content item playback of the recording and identify the media content item with timestamps of when the account initiated playback of the media content item. If the time stamp of an account is sufficiently close to the estimated start time, then the account is selected as a candidate account for being the account that initiated playback of the media content item.

In still further examples, the access management engine 192 uses location as a determining factor. For instance, the access management engine 192 receives, in addition to the one or more identifications of the media content item, a location of the target device 150. The location can have various levels of specificity, including, but not limited to, region, continent, country, state, province, city, county, ZIP Code, and GPS location, among other location information.

The access management engine 192 compares the location of the target device 150 with the locations of the devices that are candidates for playback of the media content item. The access management engine 192 uses a similarity in a location as an indication that a candidate account caused playback of the media content item. In further examples, elevation or altitude information are used to determine whether an account caused playback of media content item. For instance, two users playing the same song at substantially the same time in a same dense urban area (e.g., an office or apartment building) may have substantially similar locations, but would likely send different elevation information if the users are located on different floors.

The access management engine 192 uses one or more of the above parameters to identify a single account that caused playback of the media content item. In an example, the operation 220 includes selecting an account from an account data store based on the identifier of the media content item 120.

If no account is identified, or if multiple candidate accounts are identified with the available information, the access management engine 192 executes a remedial process. For instance, if no accounts are identified as having caused playback of the media content item, then the access management engine 192 sends a message to the target device 150 indicating an error and prompting the target device 150 to try again. If there are too many candidate accounts, the access management engine 192 sends a message to devices associated with the candidate accounts asking the devices for more information (e.g., location information or more precise location information). In an example, the access management engine causes the target device 150 to display a particular code (e.g., a string of letters or numbers) and requests that users of devices associated with the accounts enter in the code displayed on the target device 150 (e.g., via an SMS message, an in-app message, or in other manners). If the access management engine 192 receives a response from a device with the particular code, then the access management engine 192 selects the account associated with the response as the account that initiated playback.

In other instances, the access management engine 192 causes the media server application 584 to modify delivery of the media content item associated with the accounts. For instance, the media server application 584 inserts a unique watermark into the media content items being played by the candidate accounts. Simultaneously, the access management engine 192 sends a message to the target device 150 to reinitiate recording of ambient noise. The target device 150 reinitiates recording and sends the reinitiated recording to the media identification engine 190 for analysis. The media identification engine 190 detects the presence or absence of the unique watermark in the reinitiated recording, which the access management engine 192 uses to identify the account that caused playback.

At operation 222, the access management engine 192 provides credentials to the target device 150. The access management engine 192 obtains the credentials of the account identified as having caused playback of the media content item in operation 220. For instance, the access management engine 192 selects the credentials from a data store that stores account credentials. In other instances, the access management engine 192 generates new credentials associated with the account for providing to the target device 150. The access management engine 192 provides the credentials to the target device 150 for use in causing media playback or taking another action. In an example, the operation 222 includes associating then target device 150 with the account.

At operation 224, the target device 150 receives the credentials. The received credentials are stored locally at the target device 150 for use in accessing services (e.g., services provided by the media server application 584). In instances where the credentials are for use in a guest mode, the credentials are stored in a temporary area (e.g., a temporary data structure in a data store on the target device 150) or are stored in association with a time limit.

In some instances, the access management engine 192 does not provide credentials in operation 220. Instead the access management engine 192 provides an identifier associated with credentials. For instance, this may be used where the target device 150 already includes multiple different sets of credentials, and the target device 150 uses the provided identifier in order to select which of the locally stored credentials to use.

At operation 226, the target device 150 uses the received credentials to access services associated with the media server application 584. For instance, the target device 150 sends a playback request to the media server application 584 that includes the credentials (or a token based thereon). In some instances, the access is performed automatically (e.g., to confirm that the credentials are usable). In other instances, the access is performed in response to a user request.

At operation 228, the media server application transfers playback of the media content item from source device 110 to the target device 150. The media server application 584 begins transferring playback of the media content item identified in the recording from the source device 110 to the target device 150. In an example, the operation 228 includes, responsive to associating the target device 150 with the account 342, transferring the playback of the media content item 120 from the source device 110 to the target device 150. The operation 228 is able to be performed in a variety of ways. In an example, the media server application 584 causes the source device 110 to cease playback, and the media server application 584 causes the target device 150 to initiate playback of the media content item.

In an example, the operation 228 includes determining a start point within the media content item that is synchronized with playback of the media content item that is played back by the source device 110. The media server application 584 then causes playback of the media content item at the source device 110 to stop. The media server application 584 then causes playback of the identified media content item at the target device 150 based on the start point.

At operation 230, the source device 110 ceases playback of the media content item. In an example, the source device 110 ceases playback responsive to receiving a cease playback message from the media server application 584. In some instances, the ceasing of playback happens in real time, responsive to the source device 110 receiving a cease playback message from the media server application 584. In examples, the cease playback message includes a timestamp indicating a time at which to cease playback and a fade-out period over which to fade playback of the media content item (e.g., gradually reducing the volume of audio being played back in association with the media content item). In such examples, the operation 230 would include, for example, sending a fade-out message to cause playback of the media content item 120 to fade out at the source device 110 and sending a fade-in message to cause playback of the media content item 120 to fade-in at the target device 150.

At operation 232, the target device 150 plays the media content item. In some instances, the media server application 584 begins transmitting the media content item content to the target device 150 instead of to the source device 110. In other instances, such as in order to avoid stuttering in audio playback, the media server application 584 transmits the media content item simultaneously to both the source device 110 for playback and the target device 150 for playback. In this manner, there may be a period of overlap where both the source device 110 and the target device 150 are playing the media content item before the source device 110 ceases playback in operation 230. In other instances, the target device 150 receives at least a portion of the media content item from the media server application 584 along with instructions to delay playback of the media content item until a particular time. The delay provides time for the target device 150 to buffer the media content item, which promotes stutter-free playback of the media content item when the target device 150 begins playback. In some examples, the target device 150 receives an instruction that playback of the media content item fades in over time. The fade-in by the target device 150 compliments the fade-out by the source device 110 and provides an indication to the listener that the target device 150 is successfully associated with the account. As a result, the target device 150 starts playback of the media content item at a location other than the beginning of the media content item (e.g., in the middle of the media content item in a location synchronized with the playback by the source device 110).

The target device 150 need not only play the media content item. The target device 150 further plays the media content item from the same context (e.g., playlist or album) from which the source device 110 was playing. For example, as part of the transfer of playback in operation 228, the media server application 584 determines the playback context of the account using a playback log or database, and plays the media content item 232 from that context at the target device 150.

Process for Obtaining Credentials Associated with an Account

Figure 3:
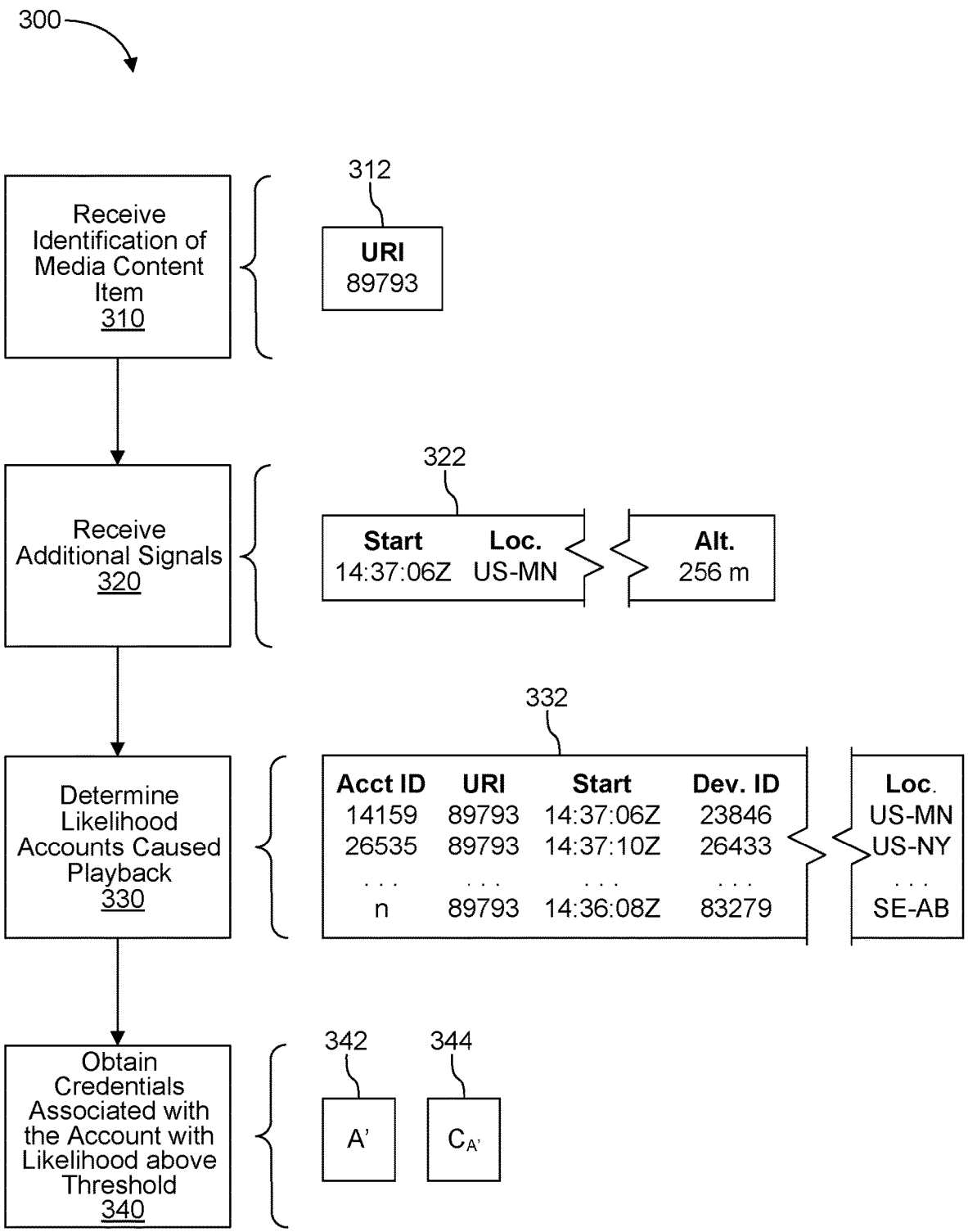
FIG. 3 illustrates a process for obtaining credentials associated with an account that caused playback.

FIG. 3 illustrates a process 300 for obtaining credentials associated with an account that caused playback. In an example, the process 300 is performed by the access management engine 192.

At operation 310, an identifier 312 of a media content item is received, such as a uniform resource identifier of the media content item. In an example, the access management engine 192 receives the identifier 312 of the media content item from the media identification engine 190. The identifier 312 is a URI (Uniform Resource Identifier) or other identification of the media content item.

At operation 320, one or more additional signals 322 are received from the target device 150. In an example, the access management engine 192 receives the one or more signals 322. The one or more signals 322 are data usable to identify a source of playback of the media content item. In the illustrated example, the signals 322 include an estimated start time of the media content item. In an example, the playback start time of the media content item 120 is estimated (e.g., based on the signals 322) and the account is selected from the data store based on the playback start time. In the illustrated example, the signals 322 further include an estimated location of the target device 150, and an altitude of the target device 150. The signals 322 are obtained directly from the target device 150 or are inferred regarding the target device 150. In some instances, the information is a last known value, such as a last-known location information. Location information takes various forms and levels of granularity. In some instances, the location information includes GPS coordinates, an address, a street name, a neighborhood name, a city name, a county name, a state name, a province name, a region name (e.g., U.S. East), a country name, a continent name, or others. In some instances, the location information includes an indication of accuracy or estimate of the location (e.g., accurate within 500 feet). In some instances, the one or more signals 322 include additional signals contained within the recording (e.g., a watermark, identifications of other sounds within the recording, and sonic qualities of the recording such as echoes, among others), an indication whether the target device 150 is moving, or an indication of a network path the target device 150 used to send the recording (e.g., using a traceroute command), among others.

At operation 330, a likelihood that a particular account caused playback of the identified media content item is determined. In an example, the operation 330 includes selecting an account 342 from an account data store 332 based on the identifier 312 of the media content item 120. This likelihood is able to be determined in a variety of different ways. In some instances, an account data store 332 containing account playback information is used as the basis for determining which account likely cause playback. The account data store 332 is maintained by the media delivery system 504. In an example, the media server application 584 maintains the account data store 332. For instance, when a media-playback engine requests playback of the media content item, the media server application 584 updates the account data store 332 with relevant information (e.g., a device identifier of the device from which the media-playback engine requests playback). In this manner, the account data store 332 is a media playback log. In many instances, the data store includes an identifier of an account as well as an identifier of a particular media content item that the account is currently playing, if any. The account data store 332 can include further information, such as when playback of the media content item was initiated (e.g., when the request for playback was sent from the media-playback engine 116, when the request was received by the media server application 584, when the media server application 584 fulfilled the request, or when the media-playback engine 116 initiated playback of the received media content item, among others). The account data store 332 can further include information, such as a device identifier of the device at which the account is playing a media content item and a location of the device, among other data. The location includes information such as an IP address of the device (e.g., an address to which media content items are sent), a location of the device, a route to the device (e.g., as the result of a trace route command), an altitude of the device, movement information of the device (e.g., whether the device is moving, whether the device is accelerating, vibrations received at the device, among other data), among other data. In an example, selecting the account 342 from the account data store 332 is further based in part on the one or more signals 322.

The data in the account data store 332 can be handled according to a defined user privacy policy. In some embodiments, data elsewhere in the system 100 can be handled according to a defined user privacy policy. Generally, data can be used to the extent allowed by the user. In examples, the system 100 provides customizable privacy parameters. For instance, the system 100 maintains one or more privacy parameters directing components of the system 100 as to what data may be stored and how the data is used. One or more parameters are user-customizable, such as through a voice command (e.g., "ahoy computer, don't store what I say" or "ahoy computer, I like my privacy!"). In an example, the system 100 disallows authentication based on playback of a media content item unless allowed by the privacy parameters. In some examples, the storage of data is based on a location of the source device 110 or the target device 150. For instance, the system 100 receives the location of the devices 110, 150 and determines privacy settings based thereon. In addition, the data contained in the account data store 332 is stored in accordance with applicable regulations. Data can also be stored and used in association with a defined security policy. For example, data can be encrypted at rest and in motion. For instance, ambient noise recording are encrypted during transmission and encrypted while stored. In an example, transmission channels (e.g., for the ambient noise recordings) are authenticated in a manner other than using user credentials, such as using data regarding the device itself.

In an example, the account data store 332 is queried based on the identifier 312 and the signals 322. In instances where the account data store 332 includes a database of the relevant account information, the database is queried using the identifier 312 and the signals 322. In other instances, the access management engine 192 iterates through one or more of the accounts and calculates a likelihood that the respective account caused playback. The various data stored in the account data store 332 can have various weights usable in calculating the likelihood that the particular account caused playback. For instance, the identifier of the song that the respective account played is heavily weighted in the calculation, such that accounts that did not play the respective media content item have a low likelihood of being identified as the account that caused playback.

Aspects such as start time may be weighted heavily as well, but there may be some variance allowed to account for various factors in discrepancies in time (e.g., due to system clocks being off, or due to differences in when the time was recorded). In further examples, the lack of data may be dispositive in some instances and may be highly relevant in others. For instance, a device in which the playback was initiated (e.g., source device 110) may not include a GPS device or may otherwise be unable to obtain a location. The lack of location for such a device need not disqualify an account associated with that device as a potential candidate. However, in some instances, where an account has not played a particular media content item at all may weigh heavily against that account being the one that caused playback, even if many other parameters match (e.g., location). In many instances, both filtering and analysis are used. For example the account data store 332 is filtered according to those accounts playing a particular media content item, and then the likelihood that those filtered accounts caused playback is determined. In an example, a machine learning framework is used to determine the likelihood that a given account caused playback (e.g., a neural network trained to determine likelihood that an account initiated playback, a decision tree, or a heuristic-based framework, among others). The machine learning framework receives the signals 322 and the identifier 312 as input. As output, the machine learning framework provides a confidence level that an account having the identifier and signals caused the playback in question.

At operation 340, credentials 344 associated with the account 342 identified in operation 330 are obtained. For example, credentials 344 are stored at and obtained from the media-delivery system 504 (e.g., as part of the access management engine 192). In an example, the credentials 344 are stored in and obtained from a database or other data structure, and indexed based on account 342. In an example, the credentials 344 are stored in the account data store 332. In other examples, the access management engine 192 generates credentials for use by the target device 150. The account 342 identified in operation 330 is used to select the relevant credentials 344. The credentials 344 are then sent to the target device 150 or otherwise provided for use. In other examples, a device identifier of the target device 150 is added to an authorized list of devices for the account 342. In an example, the operation 340 includes associating the target device 150 with the account 342 by providing the credentials 344 to the account.

Process for Guest and Primary Modes

Figure 4:
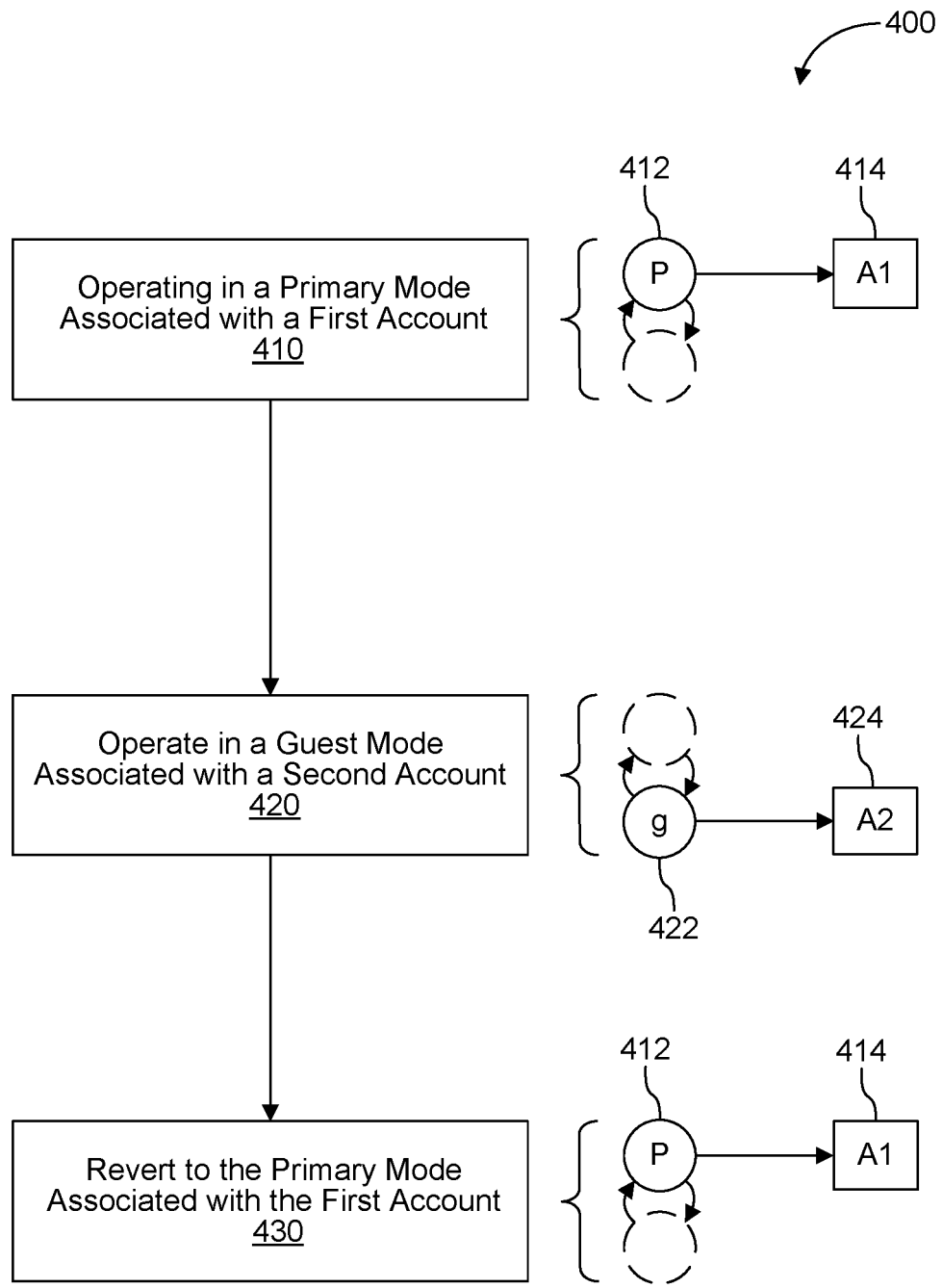
FIG. 4 illustrates a process for operating the target device guest and primary modes.

FIG. 4 illustrates a process 400 for operating the target device 150 in guest and primary modes. The process 400 begins with operation 410.

At operation 410, the target device 150 operates in a primary mode 412 associated with a first account 414. In an example the primary mode 412 is a mode in which the target device 150 will remain indefinitely until a log out or switch account command is executed. In many examples, the primary mode 412 is a mode associated with an account (e.g., the first account 414) of an owner of the target device 150. Operating the target device 150 in the primary mode 412 associated with a first account 414 includes the target device 150 using the first account 414 to access services or content associated with the first account 414. For example, the target device 150 is a smart speaker, and obtains media content items on behalf of the first account 414. This includes, for example, the target device 150 accessing a library of media content items associated with the first account 414, and obtaining items according to a taste profile associated with the first account 414, among other activities.

In an example, the target device 150 is a media playback appliance, and the operation 410 includes operating the media playback appliance in the primary mode 412 associated with the first account 414.

While operating in the primary mode 412, the target device 150 receives a guest mode signal. The guest mode signal is a signal (e.g., message, command, or other signal) that causes the target device 150 to begin the process of entering a guest mode (e.g., transition to operation 420). The target device 150 receives the guest mode signal in any of a variety of ways. In an example, the target device 150 receives the guest mode signal over a voice-based user interface. For instance, the target device 150 receives the utterance "enter guest mode", which the target device 150 analyzes (e.g., using natural language processing) and executes a guest mode process in response thereto. In another example, the target device 150 has a tactile or virtual button that, when activated, causes the target device 150 to enter a guest mode.

Continuing the media playback appliance example, responsive to receiving a guest mode signal, the media playback appliance creates the audio recording 154 using a sound sensing device of the media playback appliance. The audio recording 154 contains audio associated with a media content item 120 played by the source device 110 associated with a second account. The media playback appliance then provides the audio recording 154 from the media playback appliance to a remote server for identification of the media content item 120. For instance, the media playback appliance performs an application programming interface call with the recording 154 and a location of the media playback appliance as parameters of the application programming interface call.

At operation 420, the target device 150 operates in a guest mode 422 associated with a second account 424. This includes, the target device 150 operating according to credentials associated with the second account 424. The credentials can be obtained using any of a variety of techniques described herein, including but not limited to those described in relation to process 200 in FIG. 2.

Continuing the media playback appliance example, the operation 420 includes operating the media playback appliance in a guest mode 422 associated with a second account 424 based on the identification of the media content item 120. This can include receiving credentials 111 associated with the second account 424 at the media playback appliance and operating in the guest mode 422 using the credentials. In a further example, after beginning to operate in the guest mode 422, the media playback appliance receives, from a media server application, at least a portion of the media playback item 120 and plays the media content item 120. Playing the media content item 120 can include starting playback of the media content item 120 at a location other than a beginning of the media content item 120.

Operating in the guest mode 422 takes various forms. In some instances, operating in the guest mode 422 includes the target device 150 operating with a limited set of permissions compared to the primary mode 412. For instance, while operating in the guest mode 422, the target device 150 may be unable to perform one or more of the following actions: downloading tracks to the target device 150, modifying an equalizer of the target device 150, changing wireless settings of the target device 150, changing security settings of the target device 150, changing an ownership of the target device 150, changing account management settings of the target device 150, playing explicit tracks on the target device 150, locking the device, and obtaining primary mode status on the target device 150, among other permissions.

In an example, the guest mode 422 is a mode associated with a limited amount of time. For example, the target device 150 operates in the guest mode 422 with the second account 424 for a limited amount of time (e.g., one hour, one day, one week, one month), until a certain number of media content items are played (e.g., playback of one, two, three, or more media content items), until the occurrence of a particular event (e.g., receiving a revert command, detecting the presence of a device associated with the first account) or another event. In another example, the target device 150 operates in the guest mode 422 until a reversion signal is received. In an example, receiving the reversion signal includes receiving user input associated with reverting to the primary mode 412 over a user interface (e.g., receiving an utterance over a voice-based user interface of the target device 150 or receiving an indication that a virtual or physical user interface element associated with reversion has been actuated). In an example, when operating in the primary mode 412, the target device 150 can modify the permissions of the guest mode 422 (e.g., based on user input).

In another example, the target device 150 operates in the guest mode 422 until a device power event occurs. For instance, the target device 150 operates in the guest mode until the target device 150 powers on, powers off, enters a sleep mode, enters an inactive state, enters an active state, wakes up, restarts, loses power, or gains power, among others. The target device 150 then reverts to the primary mode 412 with the first account 414.

In some examples, operating in a guest mode 422 includes the target device 150 storing credentials of the account (e.g., the first account 414) associated with the primary mode 412. In an example, the target device 150 stores credentials associated with the account (e.g., the first account) associated with the primary mode 412 in memory for later use. Storing the credentials in memory facilitates the target device 150 reverting from, for example, operating in the guest mode 422 with the second account 424 to operating in the primary mode 412 with the first account 414 without re-receiving the credentials associated with the first account 414, which saves the user time and reduces resource consumption (e.g., by not requiring the user associated with the first account 414 to re-log into the target device 150).

At operation 430, the target device 150 reverts to the primary mode 412 associated with the first account 414 from the guest mode 422 associated with the second account 424. The reversion is triggered by one or more of the conditions or criteria described in operation 420. Reverting can include accessing credentials associated with the first account 414 that are stored locally to the device. In some examples, reverting includes obtaining the credentials from a remote server (e.g., the target device 150 accessing an application programming interface associated with the access management engine 192 at the media-delivery system 504).

Continuing the media playback appliance example, operation 430 includes responsive to the media playback appliance receiving a reversion signal while operating in the guest mode 422 associated with the second account 424, operating the media playback appliance in the primary mode 412 associated with the first account 414. In an example, the media playback appliance automatically reverts to the primary mode 412 associated with the first account 414 after the occurrence of an event, such as a device power event.

Other Embodiments

Although this application is primarily described in relation to audio, the systems and methods described herein can be applied to other content including visual content. For instance, rather than the target device 150 receiving audio content via a microphone or other input mechanisms, the target device 150 can use a camera to obtain visual information provided at a display of the source device 110. In an example, the source device presents a visual media content item (e.g., a television show, a movie, a piece of art, a webpage having particular visual characteristics, text content, among others). This visual content is then sent to the media-delivery system 504 for processing. A media identification engine at a media-delivery system 504 can identify the visual content in the way described above, except in relation to visual content.

Device Environment

Figure 5A:
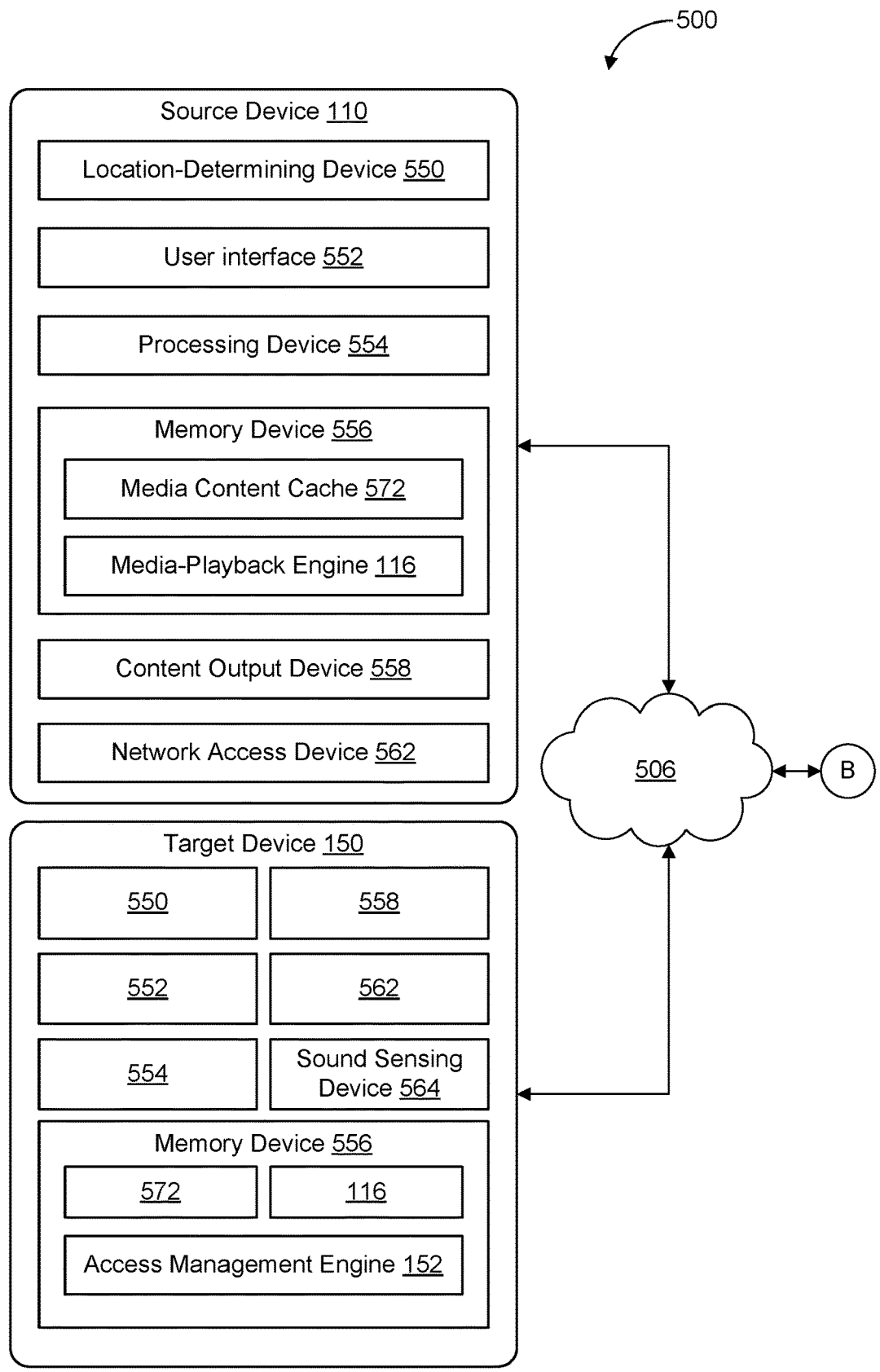
FIG. 5A illustrates a portion of an example media content playback system for association via audio.
Figure 5B:
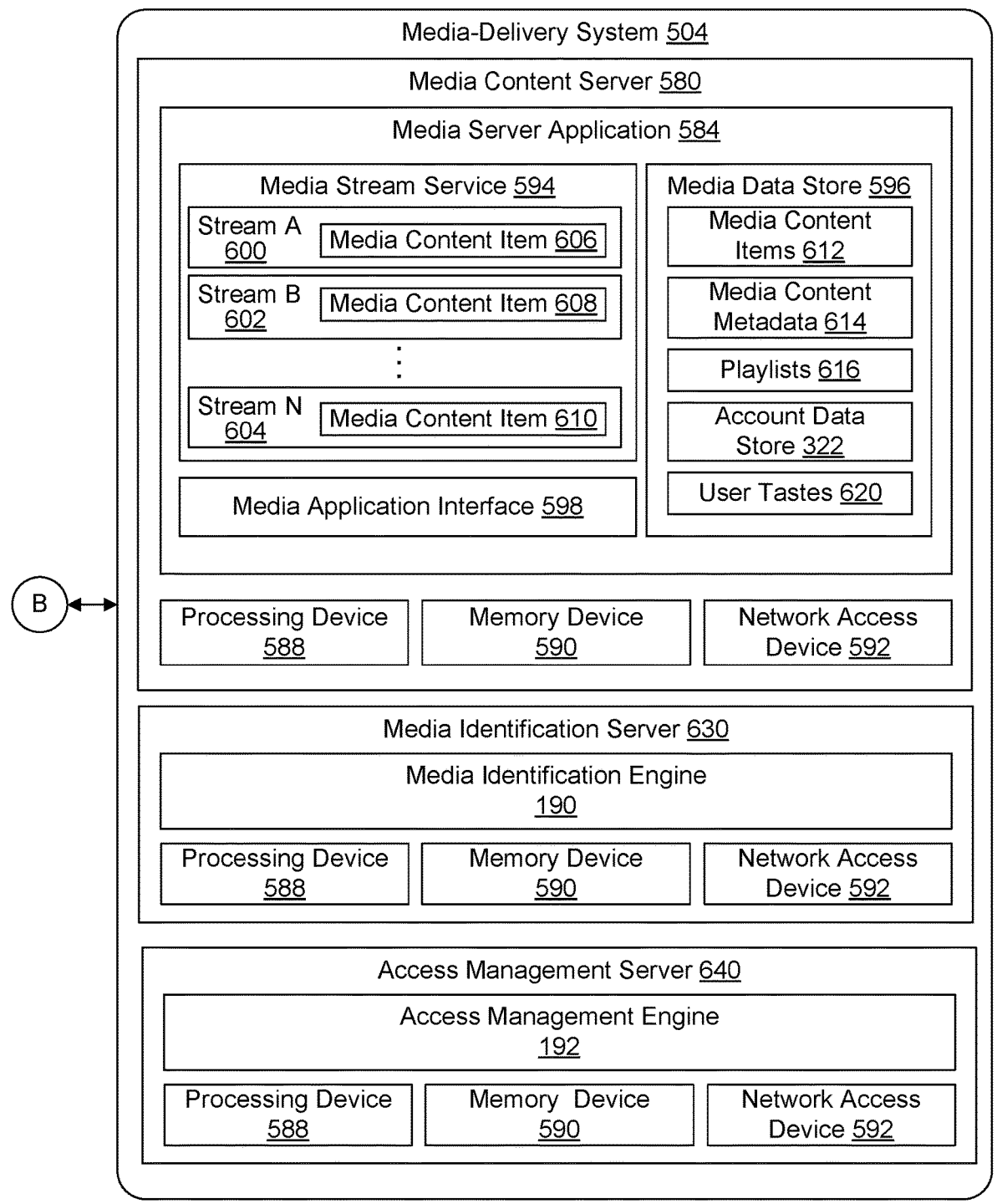
FIG. 5B illustrates a portion of an example media content playback system for association via audio.

FIG. 5A and FIG. 5B, illustrate an example system 500 for association via audio. The example system 500 is a media content playback system for association via audio and includes the source device 110 including a media-playback engine 116 and the target device 150 communicatively coupled across a network 506 to a media-delivery system 504.

Source Device

The source device 110 plays media content items to produce media output. In some embodiments, the media content items are provided by the media-delivery system 504 and transmitted to the source device 110 using the network 506. A media content item is an item of media content, including audio, video, or other types of media content, which may be stored in any format suitable for storing media content. Non-limiting examples of media content items include songs, music, albums, audiobooks, music videos, movies, television episodes, podcasts, other types of audio or video content, and portions or combinations thereof.

The source device 110 plays the media content for the user. The media content is also picked up by the target device 150 via a sound-sensing device 564. The media content is selectable for playback with user input. The media content is also selectable for playback without user input, such as by the source device 110 or the media-delivery system 504. In an example, media content is selected for playback by the media-delivery system 504 based on stored user taste profile information and other criteria.

The source device 110 selects and plays media content and generates interfaces for controlling playback of media content items. In some examples, the media-playback engine 116 receives input from a user over a user interface, such as a touch screen user interface, an utterance-based user interface, tactile user interfaces, virtual user interfaces, or other user interfaces.

The source device 110 can include other input mechanisms, including, but not limited to a keypad and/or a cursor control device. The keypad may be configured for inputting alphanumeric characters and/or other key information. The cursor control device may include, for example, a handheld controller or mouse, a rotary input mechanism, a trackball, a stylus, and/or cursor direction keys.

As noted above, the source device 110 plays media content items. In some embodiments, the source device 110 plays media content items that are provided (e.g., streamed, transmitted, etc.) by a system external to the media-playback device such as the media-delivery system 504, another system, or a peer device. Alternatively, in some embodiments, the source device 110 plays media content items stored locally on the source device 110. Further, in at least some embodiments, the source device 110 plays media content items that are stored locally as well as media content items provided by other systems.

In some embodiments, the source device 110 is a computing device, handheld entertainment device, smartphone, tablet, watch, wearable device, or any other type of device capable of playing media content. In yet other embodiments, the source device 110 is a media playback appliance, such as an in-dash vehicle head unit, an aftermarket vehicle media playback appliance, a smart assistant device, a smart home device, a television, a gaming console, a set-top box, a network appliance, a BLU-RAY disc player, a DVD player, a media player, a stereo system, smart speaker, an Internet of things device, or a radio, among other devices or systems.

In at least some embodiments, the source device 110 includes a location-determining device 550, a user interface 552, one or more processing devices 554, a memory device 556, a content output device 558, a movement-detecting device, a network access device 562, a sound-sensing device 564, and an optical-sensing device. Other embodiments may include additional, different, or fewer components. For example, some embodiments do not include one or more of the location-determining device 550, the sound-sensing device 564, and the optical-sensing device.

The location-determining device 550 is a device that determines the location of the source device 110. In some embodiments, the location-determining device 550 uses one or more of the following technologies: Global Positioning System (GPS) technology which may receive GPS signals from satellites, cellular triangulation, network-based location identification, WI-FI positioning systems, ultrasonic positioning systems, and combinations thereof. Examples of the location-determining device 550 further include altitude- or elevation-determining devices, such as barometers.

The user interface 552 operates to interact with the user, including providing output and receiving input. The user interface 552 can be a physical device that interfaces with the user (e.g., touch screen display) or a combination of devices that interact with the user (e.g., speaker and microphone for providing an utterance-based user interface).

In some examples, the user interface includes a touch screen based user interface. A touch screen operates to receive an input from a selector (e.g., a finger, stylus, etc.) controlled by the user. In some embodiments, the touch screen operates as both a display device and a user input device. In some embodiments, the user interface 552 detects inputs based on one or both of touches and near-touches. In some embodiments, the touch screen displays a user interface for interacting with the source device 110. As noted above, some embodiments do not include a touch screen.

Examples of the user interface 552 include input control devices that control the operation and various functions of the source device 110. Input control devices include any components, circuitry, or logic operative to drive the functionality of the source device 110. For example, input control device(s) can include one or more processors acting under the control of an application.

While some embodiments do not include a display device, the embodiments that do often include a graphics subsystem coupled to an output display, such as a TFT (Thin Film Transistor), TFD (Thin Film Diode), OLED (Organic Light-Emitting Diode), AMOLED display (active-matrix organic light-emitting diode), and/or liquid crystal display (LCD)-type displays. The displays can also be touch screen displays, such as capacitive and resistive-type touch screen displays.

The one or more processing devices 554 include one or more processing units, such as central processing units (CPU), digital signal processors, and field-programmable gate arrays, among others.

The memory device 556 operates to store data and instructions. In some embodiments, the memory device 556 stores instructions for the media-playback engine 116. Some embodiments of the memory device 556 also include a media content cache 572. The media content cache 572 stores media-content items, such as media content items that have been previously received from the media-delivery system 504. The media content items stored in the media content cache 572 are storable in an encrypted or unencrypted format, and decryption keys for some or all of the media content items are also stored. The media content cache 572 can also store metadata about media-content items such as title, artist name, album name, length, genre, mood, or era. The media content cache 572 can also store playback information about the media content items, such as the number of times playback of the media content item has been requested or the current location of playback.

The memory device 556 typically includes at least some form of computer-readable media. Computer readable media includes any available media that can be accessed by the source device 110. By way of example, computer-readable media include computer readable storage media and computer readable communication media.

Computer readable storage media includes volatile and nonvolatile, removable and non-removable media implemented in any device that stores information such as computer readable instructions, data structures, program modules, or other data. Computer readable storage media includes, but is not limited to, random access memory, read only memory, electrically erasable programmable read only memory, flash memory and other memory technology, compact disc read only memory, BLU-RAY discs, DVD discs, other optical storage, magnetic cassettes, magnetic tape, magnetic disk storage, other magnetic storage devices, or any other medium that can be used to store the desired information and that can be accessed by the source device 110. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct wired connection, and wireless media such as acoustic, radio frequency, infrared, and other wireless media. Combinations of any of the above are also included within the scope of computer readable media.

The content output device 558 operates to output media content. In many examples, the content output device 558 provides media output for a user. In some examples, the content output device 558 provides media output to a target device 150. Examples of the content output device 558 include a speaker assembly having one or more speakers, an audio output jack, a BLUETOOTH transmitter, a display panel, and a video output jack. Other embodiments are possible as well, such as transmitting a signal through the audio output jack or BLUETOOTH transmitter that can be used to reproduce an audio signal by a connected or paired device such as headphones, speaker system, or vehicle head unit.

The network access device 562 operates to communicate with other computing devices over one or more networks, such as the network 506. Examples of the network access device include one or more wired network interfaces and wireless network interfaces. Examples of wireless network interfaces include infrared, BLUETOOTH wireless technology, 802.11a/b/g/n/ac, and cellular or other radio frequency interfaces.

In some examples, the source device 110 includes a movement detecting device that senses movement of the source device 110, acceleration of the source device 110, determines an orientation of the source device 110, or includes other detecting devices. In at least some examples, the detecting devices include one or more accelerometers or other motion detecting technologies or orientation detecting technologies.

The network 506 is an electronic communication network that through which the source device 110, the media delivery system 504, and the target device 150 communicate. An electronic communication network includes a set of computing devices and links between the computing devices. The computing devices in the network use the links to enable communication among the computing devices in the network. The network 506 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 506 includes various types of links. For example, the network 506 can include wired and/or wireless links, including BLUETOOTH, ultra-wideband (UWB), 802.11, ZIGBEE, cellular, and other types of wireless links. Furthermore, in various embodiments, the network 506 is implemented at various scales. For example, the network 506 can be implemented as one or more vehicle area networks, local area networks (LANs), metropolitan area networks, subnets, wide area networks (such as the Internet), or can be implemented at another scale. Further, in some embodiments, the network 506 includes multiple networks, which may be of the same type or of multiple different types.

Target Device

The target device 150 can include one or more of the components of the source device 110. The aspects described herein are relevant to using an account of the source device 110 on the target device 150. In an example, the association is performed using a sound sensing device 564 of the target device 150. In some examples, it is otherwise difficult for a user to provide account information to the target device 150, such as the target device 150 lacking a keyboard, touch screen, or other components that receive arbitrary input. In some examples, the target device 150 lacks a direct connection with the source device 110 over BLUETOOTH, WI-FI, or other electronic communication schemes.

The sound-sensing device 564 senses sounds proximate the target device 150 (e.g., sounds within a vehicle in which the target device 150 is located). In some embodiments, the sound-sensing device 564 comprises one or more microphones. In some examples, the sound-sensing device 564 includes multiple microphones in a sound-canceling arrangement to facilitate operation in a noisy environment (e.g., configured for use in a vehicle). The sound-sensing device 564 is able to capture sounds from proximate the target device 150 and create a representation thereof. These representations are analyzed by the target device 150 or the media-delivery system 504.

In some examples, the representations are used to provide an utterance-based user interface. In such examples, speech recognition technology is used to identify words spoken by the user. The words are recognized as commands affect the behavior of the target device 150 (e.g., affecting playback of media content by the target device 150). Natural language processing and/or intent-recognition technology are usable to determine appropriate actions to take based on the spoken words.

Additionally or alternatively, the sound sensing device 564 determines various sound properties about the sounds proximate the user such as volume, dominant frequency or frequencies, among other properties. These sound properties are usable to make inferences about the environment proximate to the target device 150, such as whether the sensed sounds correspond to playback of a media content item. In some embodiments, the sound sensed by the sound-sensing device 564 are transmitted to media-delivery system 504 (or another external system) for analysis, such as using speech-recognition, intent-recognition, and media identification technologies, among others.

Media-Delivery System

The media-delivery system 504 comprises one or more computing devices and provides media content items to the source device 110 and, in some embodiments, other media-playback devices as well. The media-delivery system 504 includes a media content server 580, a media identification server 630, and an access management server 640. Although FIG. 5B shows single instances of the servers 580, 630, 640, some embodiments include multiple servers. In these embodiments, each of the multiple servers may be identical or similar and may provide similar functionality (e.g., to provide greater capacity and redundancy, or to provide services from multiple geographic locations). Alternatively, in these embodiments, some of the multiple servers may perform specialized functions to provide specialized services (e.g., services to enhance media content playback during travel or other activities, etc.). Various combinations thereof are possible as well.

The media content server 580 transmits stream media to media-playback devices, such as the source device 110 or target device 150. In some embodiments, the media content server 580 includes a media server application 584, a processing device 588, a memory device 590, and a network access device 592. The processing device 588, memory device 590, and network access device 592 may be similar to the one or more processing devices 554, memory device 556, and network access device 562 respectively, which have each been previously described.

In some embodiments, the media server application 584 streams music or other audio, video, or other forms of media content. The media server application 584 includes a media stream service 594, a media data store 596, and a media application interface 598. The media stream service 594 operates to buffer media content such as media content items 606, 608, and 610 for streaming to one or more streams 600, 602, and 604.

The media application interface 598 can receive requests or other communication from media-playback devices or other systems, to retrieve media content items from the media content server 580. For example, the media application interface 598 receives a communication from the media-playback engine 116.

In some embodiments, the media data store 596 stores media content items 612, media content metadata 614, and playlists 616. The media data store 596 may comprise one or more databases and file systems. As noted above, the media content items 612 may be audio, video, or any other type of media content, which may be stored in any format for storing media content.

The account data store 332 is used to identify users of a media streaming service provided by the media-delivery system 504. In some embodiments, an account allows a user to authenticate to the media-delivery system 504 and enable the user to access resources (e.g., media content items 612, playlists 616, etc.) provided by the media-delivery system 504. In some embodiments, the user can use different devices to log into the account and access data associated with the account in the media-delivery system 504. User authentication information, such as a username, an email account information, a password, and other credentials, can be used by the user to log into his or her account. In some examples, the account data store 332 is stored in association with the accounts.

The media data store 596 includes user tastes data 620. The user tastes data 620 includes but is not limited to user preferences regarding media content items, such as media content items that the user likes/dislikes, media content item qualities that the user likes/dislikes, historical information about the user's consumption of media content, libraries of media content items, and playlists of media content items, among other user data.

The media content metadata 614 operates to provide various information associated with the media content items 612. In some embodiments, the media content metadata 614 includes one or more of title, artist name, album name, length, genre, mood, era, acoustic fingerprints, and other information. The playlists 616 operate to identify one or more of the media content items 612. In some embodiments, the playlists 616 identify a group of the media content items 612 in a particular order. In other embodiments, the playlists 616 merely identify a group of the media content items 612 without specifying a particular order. Some, but not necessarily all, of the media content items 612 included in a particular one of the playlists 616 are associated with a common characteristic such as a common genre, mood, or era. The playlists 616 may include user created playlists, which may be available to a particular user, a group of users, or to the public.

The media identification server 630 is a server that provides media identification services using a media identification engine 190. In examples, the media identification server 630 exposes application programming interface endpoints usable by calling devices or functions to access media identification services provided by the media identification server 630 using the media identification engine 190. The media identification server 630 can include a processing device 588, a memory device 590, and a network access device 592.

The access management server 640 is a server that provides access management services using the access management engine. In examples, the server exposes application programming interface endpoints usable by calling devices or functions to use access management services provided by the access management server 640 using the access management engine 192. The access management server 640 can include a processing device 588, a memory device 590, and a network access device 592.

Each of the source device 110 and the media-delivery system 504 can include additional physical computer or hardware resources. In at least some embodiments, the source device 110 communicates with the media-delivery system 504 via the network 506.

Although in FIG. 5A only one source device 110, target device 150, and media-delivery system 504 are shown, in accordance with some embodiments, the media-delivery system 504 can support the simultaneous use of devices, and the devices 110, 150 can simultaneously access media content from multiple media-delivery systems 504. Additionally, although FIGS. 5A and 5B illustrate a streaming media-based system for media-playback, other embodiments are possible as well. For example, in some embodiments, the source device 110 includes a media data store and the source device 110 selects and plays back media content items without accessing the media-delivery system 504. Further in some embodiments, the source device 110 operates to store previously streamed media content items in a local media data store (e.g., in the media content cache 572).

In at least some embodiments, the media-delivery system 504 can be used to stream, progressively download, or otherwise communicate music, other audio, video, or other forms of media content items to the source device 110 or target device 150 for playback. In accordance with an embodiment, the user interface 552 receives input from a user to, for example, select media content for playback during travel on the source device 110.

Software embodiments of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, magnetic disks, optical disks, magneto-optical disks, or other types of media/machine-readable medium suitable for storing or transmitting electronic instructions. The techniques described herein are not limited to any particular software configuration. They may find applicability in any computing or processing environment. In some embodiments, there are one or more processors that operate as a particular program product or engine. In some embodiments, one or more processors are coupled to a memory storing instructions which when executed cause the one or more processors to operate in a particular manner. In some embodiments, the one or more processors can include two or more sets of processors operating on different devices.

The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Further, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments include a computer program product. The computer program product may be a storage medium or media having instructions stored thereon or therein which can be used to control, or cause, a computer to perform any of the procedures of the example embodiments of the invention. The storage medium may, include without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described above.

Set of Data Structures

Figure 6:
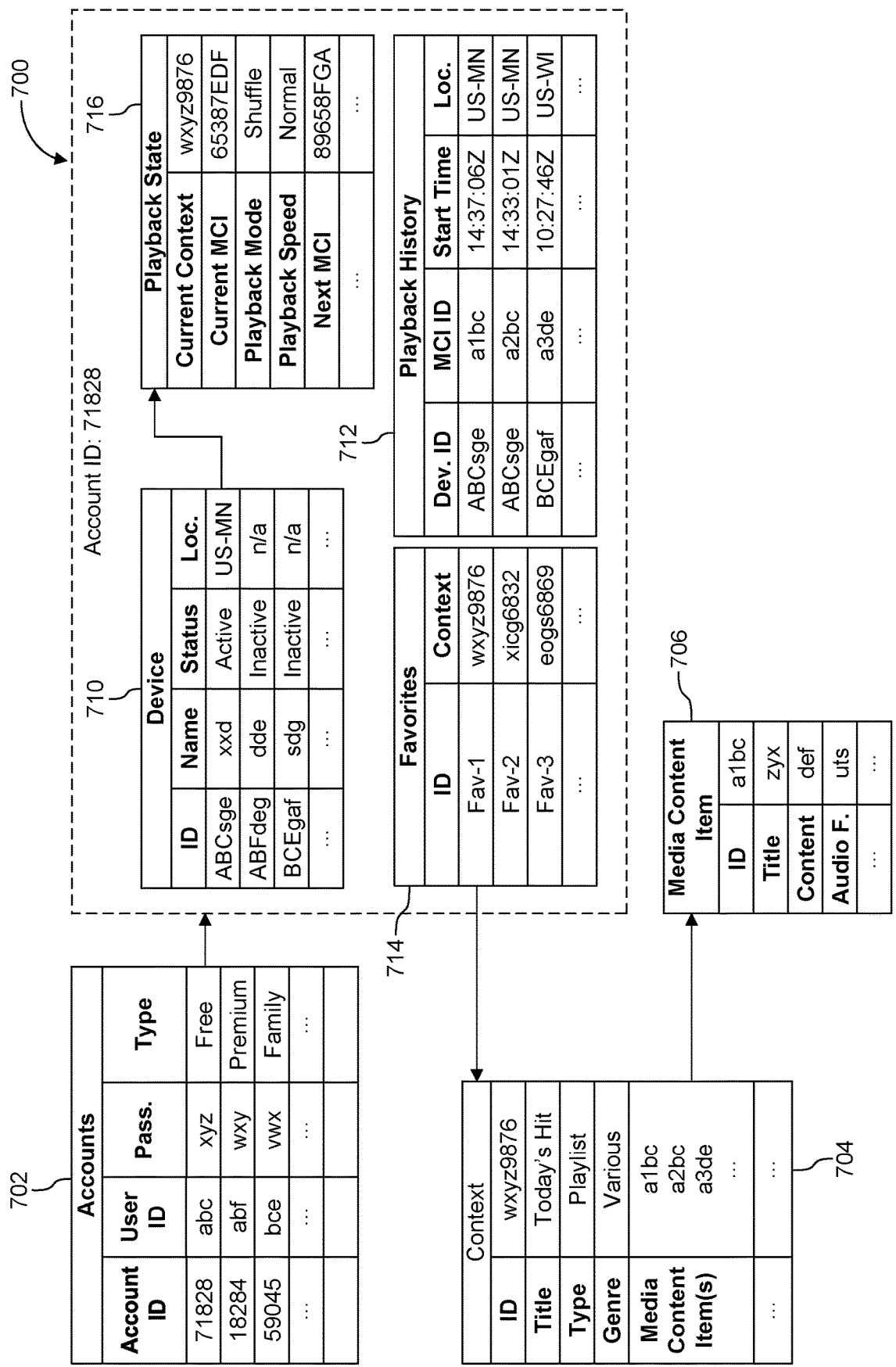
FIG. 6 illustrates an example set of data structures storable in a data store.

FIG. 6 illustrates an example set of data structures 700 storable in the media data store 596. As illustrated, the set of data structures 700 includes an account table 702, a media content item context data structure 704, and a media content item data structure 706. For each account record in the account table 702, the data structure 700 includes a device data table 710, a playback history table 712, a favorites table 714, and a playback state data structure 716. It is noted that, where user data is used, it can be handled according to a defined user privacy policy and can be used to the extent allowed by the user. Where the data of other users is used, it can be handled in an anonymized matter so the user does not learn of the details of other users generally or specifically. In addition, the data contained in the set of data structures 700 is stored according to a defined security policy and in accordance with applicable regulations.

As illustrated, each account record in the account table 702 has a relationship with a device data table 710, a playback history table 712, and a favorites table 714. Each device record in the device data table 710 has a relationship with a playback state data structure 716. Each device record in a favorites table 714 has a relationship with a media content item context data structure 704. Each context data structure has a relationship with the media content item data structure 706.

The account table 702 stores one or more account records usable to identify accounts of the media-delivery system 504. In some examples, some or all of the data from the account data store 332 of FIG. 3 is obtained from the set of data structures 700. For instance, the data in account data store 332 is obtained by querying the set of data structures 700 for particular data. In an example, where a particular account is referred to in this disclosure (e.g., account 342), the account is associated with an entry stored in the data structure 700. In an example, when the target device 150 accesses the media-delivery system 504 under the account 342, the media-delivery system 504 locates an account record corresponding to the account 342 in the account table 702. The media-delivery system 504 then uses the data associated with the account record in the account table 702 to provide services. For instance, the media-delivery system 504 provides a media content item described in the favorites table 714 to the target device 150 and updates the playback history table 712 accordingly.

The account table 702 references one or more other tables, and is referenced by one or more other tables. In an example, each account record of the account table 702 corresponds to an account. For instance, the first account 414 corresponds to a first account record in the account table 702, and the second account 424 corresponds to a second account record in the account table 702, and the account 342 can correspond to a third account record in the account table 702. Each account record of the account table 702 includes data associated with one or more fields of the account table 702, such as an account ID field, a user ID field, a password field, and a type field. The account ID field stores an identifier of the account record, such as using a number. The user ID field stores an identifier of a user, such as the user's name. The password field stores data associated with a password of the user, such as a hashed and salted password. The type field identifies subscription types associated with the account record.

Each account record identified in the account table 702 is associated with, and identifies, data for providing various services from the media-delivery system 504. In some examples, the data includes the device data table 710, the playback history table 712, the favorites table 714, and the playback state data structure 716, among others. In the illustrated example, the tables 710, 712, and 714 are primarily described in association with a single record (e.g., the record having the Account ID: 71828). However, it is understood that, in other embodiments, the tables 710, 712, and 714 can be structured to be associated with a plurality of accounts The device data table 710 identifies one or more devices associated with a particular account record of the account table 702. The device data table 710 is referenced by the account table 702 or other tables. The device data table 710 can reference one or more other tables.

In an example, each device record of the device data table 710 includes data associated with a device. For instance, a first device record of the device data table 710 corresponds to the source device 110, and a second device record of the device data table 710 corresponds to the target device 150 once both devices 110, 150 have been associated with the same account. Each device record of the device data table 710 includes data associated with one or more fields of the device data table 710, such as a device ID field (e.g., storing device identifier data, such as an alphanumeric identifier), a name field (e.g., for storing a device name), a status field (e.g., for storing a status of the device, such as whether the device is currently active or inactive), and a location field (e.g., for storing a last known location of the device).

The playback history table 712 describes the media content items played by the account by storing one or more playback records. The playback history table 712 can reference and be referenced by one or more other tables. In an example, each playback record of the playback history table 712 includes data associated with a media content item played by a respective account or device. Each playback record of the playback history table 712 includes data associated with one or more fields of the playback history table 712, such as a device ID field (e.g., for storing an identifier of the device that caused playback of the playback record), a MCI (Media Content Item) ID field (e.g., for storing an identifier of the media content item that was played back), a start time field (e.g., for identifying the start time at which the media content item was played back), and a location field (e.g., for identifying the location of the device associated with the device ID when playback was initiated).

The favorites table 714 describes information about favorite media content item contexts associated with the account by storing one or more favorite records. The favorites table 714 includes information about favorites associated with an account. The favorites table 714 can reference and be referenced by one or more other tables. In an example, each favorite record of the favorites table 714 includes data associated with a favorite media content item context (e.g., album or playlist). Each favorite record of the favorites table 714 includes data associated with one or more fields of the favorites table 714, such as an ID field (e.g., for identifying the favorite record) and a context field (e.g., for identifying a media content item context associated with the favorite record).

The context data structure 752 is a data structure (e.g., record of a table or other data structure) that contains data associated with a media content item context (e.g., album or playlist). The context data structure 752 can reference and be referenced by one or more tables or other data structures. The context data structure 752 stores data regarding a particular media content item context in one or more fields, such as an ID field (e.g., for identifying the context data structure 752), a title field (e.g., a string naming the context data structure 752), a type field (e.g., for describing the type of the media content item context, such as a playlist, album, or television season), and media content item field (e.g., for identifying one or more media content items of the context data structure 752).

The media content item data structure 706 is a data structure (e.g., record of a table or other data structure) that contains data associated with a media content item. The media content item data structure 706 can reference and be referenced by one or more tables or other data structures. The media content item data structure 706 stores data regarding a particular media content item in one or more fields, such as an ID field (e.g., storing an identifier of the media content item data structure 706), a title field (e.g., storing a title of the media content item data structure 706, such as a song title), a content field (e.g., storing the content of the media content item or a link to the content of the media content item data structure 706, such as the audio content of a song), and an audio fingerprint field. In an example, the audio fingerprint field stores an audio fingerprint of the content of the media content item data structure 706 that was generated using one or more of the techniques described herein. In an example, where the media identification engine 190 compares the audio fingerprint of the ambient noise recording 154 to audio fingerprints of known media content items, each of the audio fingerprints of known media content items is stored in a respective media content item data structure 706.

The playback state data structure 716 is a data structure (e.g., a record of a table or other data structure) that contains data associated with a state of a device (e.g., a state associated with a device record of the device data table 710). The playback state data structure 716 can reference and be referenced by one or more tables or other data structures. The playback state data structure 716 stores data regarding a particular playback state in one or more fields, such as a current context field (e.g., describing a current context from which a device is playing, such as by containing an identifier of the context), a current MCI (Media Content Item) (e.g., describing a current media content item that is playing, such as by containing an identifier of the media content item), a playback mode field (e.g., describing a playback mode of the device, such as shuffle or repeat), a playback speed field (e.g., describing a current playback speed), and a next MCI field (e.g., describing the next media content item to be played).

Various operations and processes described herein can be performed by the cooperation of two or more devices, systems, processes, or combinations thereof.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A method, comprising:
   operating, by a server, a media playback appliance in a primary mode associated with a first account;
   playing, by a source device associated with a second account, a media content item;
   responsive to the media playback appliance receiving a guest mode signal, recording, by the media playback appliance, an audio recording including at least a portion of the media content item;
   providing, by the media playback appliance, the audio recording from the media playback appliance to the server;
   identifying, by the server, an identifier of the media content item using the audio recording;
   identifying, by the server, credentials associated with the second account based on the identifier of the media content item;
   operating, by the server, the media playback appliance in a guest mode associated with the second account;
   transferring, by the server, playback of the media content item from the device associated with the second account to the media playback appliance; and
   determining, by the server, a start point within the media content item that is synchronized with the playback by the source device associated with the second account, wherein transferring the playback comprises causing the source device associated with the second account to cease playback of the media content item and causing the media playback appliance to initiate playback of the media content item based on the start point.

2. The method of claim 1, wherein transferring the playback comprises causing the device associated with the second account to cease playback of the media content item and causing the media playback appliance to initiate playback of the media content item.

3. The method of claim 1, further comprising sending, by the server, the credentials to the media playback appliance, wherein operating the media playback appliance in the guest mode associated with the second account is based on the credentials.

4. The method of claim 1, wherein operating the media playback appliance in the guest mode comprises preventing, by the server, the media playback appliance from (i) downloading tracks to the media playback appliance, (ii) modifying an equalizer of the media playback appliance, (iii) changing wireless settings of the media playback appliance, (iv) changing security settings of the media playback appliance, (v) changing an ownership of the media playback appliance, (vi) changing account management settings of the media playback appliance, (vii) playing explicit tracks on the media playback appliance, (viii) locking the device, or (ix) any combination of (i)-(viii).

5. The method of claim 1, further comprising operating the media playback appliance in the primary mode in response to operating the media playback appliance in the guest mode for an amount of time.

6. The method of claim 1, wherein the media playback appliance receives the guest mode signal over a voice-based user interface.

7. The method of claim 1, wherein identifying credentials associated with the second account is further based on a media playback history associated with the second account.

8. A system for performing association via audio, comprising:
one or more processing devices; and
a computer-readable memory device coupled to the one or more processing devices and comprising instructions thereon that, when executed by the one or more processing devices, cause the one or more processing devices to:
operate, by a server, a media playback appliance in a primary mode associated with a first account;
play, by a source device associated with a second account, a media content item;
responsive to the media playback appliance receiving a guest mode signal, recording, by the media playback appliance, an audio recording including at least a portion of the media content item;
provide, by the media playback appliance, the audio recording from the media playback appliance to the server;
identify, by the server, an identifier of the media content item using the audio recording
identify, by the server, credentials associated with the second account based on the identifier of the media content item;
operate, by the server the media playback appliance in a guest mode associated with the second account;
transfer, by the server, playback of the media content item from the device associated with the second account to the media playback appliance; and
determine a start point within the media content item that is synchronized with the playback by the source device associated with the second account, wherein to transfer the playback comprises to cause the source device associated with the second account to cease playback of the media content item and to cause the media playback appliance to initiate playback of the media content item based on the start point.

9. The system of claim 8, wherein to transfer the playback includes to cause the device associated with the second account to cease playback of the media content item and causing the media playback appliance to initiate playback of the media content item.

10. The system of claim 8, wherein to transfer playback of the media content item from the device associated with the second account to the media playback appliance includes to send a fade-out message to cause playback of the media content item to fade out at the device associated with the second and to send a fade-in message to cause playback of the media content item to fade-in at the media playback appliance.

11. The system of claim 8, wherein the instructions when executed further cause the one or more processing devices to send the credentials to the media playback appliance, wherein to operate the media playback appliance in the guest mode associated with the second account is based on the credentials.

12. The system of claim 8, wherein the instructions when executed further cause the one or more processing devices to operate the media playback appliance in the primary mode in response to operating the media playback appliance in the guest mode for an amount of time.

13. The system of claim 8, wherein identify the credentials associated with the second account is further based on a media playback history associated with the second account.

14. A system comprising:
a source device associated with a first account having one or more source device processing devices coupled to a source device memory device storing source device instructions which when executed cause the one or more source device processing devices to play a media content item;
a media playback appliance having one or more media playback appliance processing devices coupled to a media playback appliance memory device storing media playback appliance instructions which when executed cause the one or more media playback appliance processing devices to:
responsive to the media playback appliance receiving a guest mode signal, record an audio recording including at least a portion of the media content item, and
provide the audio recording for identification of the media content item; and
a remote server having one or more remote server processing devices coupled to a remote server memory device storing remote server instructions which when executed cause the one or more remote server processing devices to:
operate the media playback appliance in a primary mode associated with a second account,
identify an identifier of the media content item using the audio recording,
identify credentials associated with the first account based on the identifier of the media content item;
operate the media playback appliance in a guest mode associated with the first account,
transfer playback of the media content item from the source device associated with the first account to the media playback appliance; and
determine a start point within the media content item that is synchronized with the playback by the source device associated with the first account, wherein to transfer the playback comprises to cause the source device associated with the first account to cease playback of the media content item and to cause the media playback appliance to initiate playback of the media content item based on the start point.

15. The system of claim 14, wherein to transfer the playback includes to cause the source device associated with the first account to cease playback of the media content item and causing the media playback appliance to initiate playback of the media content item.

16. The system of claim 14, wherein to transfer playback includes to send a fade-out message to cause playback of the media content item to fade out at the source device associated with the first account and to send a fade-in message to cause playback of the media content item to fade-in at the media playback appliance.

17. The system of claim 14, wherein the remote server instructions when executed further cause the one or more remote server processing devices to operate the media playback appliance in the primary mode in response to operating the media playback appliance in the guest mode for an amount of time.

18. The system of claim 14, wherein the media playback appliance instructions when executed further cause the one or more media playback appliance processing devices to receive the guest mode signal over a voice-based user interface.

19. The system of claim 14, wherein the remote server instructions when executed further cause the one or more remote server processing devices to send the credentials to the media playback appliance, wherein operating the media playback appliance in the guest mode associated with the second account is based on the credentials.

20. The system of claim 14, wherein identify the credentials associated with the first account is further based on a media playback history associated with the first account.

* * * * *